United States Patent
DaBoll-Lavoie et al.

(10) Patent No.: US 11,204,950 B2
(45) Date of Patent: Dec. 21, 2021

(54) AUTOMATED CONCEPTS FOR INTERROGATING A DOCUMENT STORAGE DATABASE

(71) Applicant: Optum, Inc, Minnetonka, MN (US)

(72) Inventors: Abigail DaBoll-Lavoie, Brookline, MA (US); Deana Jagielo, Chaska, MN (US); Daniel George McCreary, St. Louis Park, MN (US)

(73) Assignee: Optum, Inc., Minnetonka, MN (US)

( * ) Notice: Subject to any disclaimer, the term of this patent is extended or adjusted under 35 U.S.C. 154(b) by 617 days.

(21) Appl. No.: 16/151,092

(22) Filed: Oct. 3, 2018

(65) Prior Publication Data

US 2019/0108274 A1   Apr. 11, 2019

Related U.S. Application Data

(60) Provisional application No. 62/568,847, filed on Oct. 6, 2017.

(51) Int. Cl.
| | | |
|---|---|---|
| G06F 16/33 | (2019.01) | |
| G06F 16/38 | (2019.01) | |
| G06F 16/93 | (2019.01) | |
| G06F 16/338 | (2019.01) | |
| G06F 40/295 | (2020.01) | |

(52) U.S. Cl.
CPC ........ G06F 16/3338 (2019.01); G06F 16/338 (2019.01); G06F 16/38 (2019.01); G06F 16/93 (2019.01); G06F 40/295 (2020.01)

(58) Field of Classification Search
None
See application file for complete search history.

(56) References Cited

U.S. PATENT DOCUMENTS

| | | | | |
|---|---|---|---|---|
| 2010/0228693 A1* | 9/2010 | Dawson | ................ | G06F 16/322 706/12 |
| 2013/0262449 A1* | 10/2013 | Arroyo | ............... | G06F 16/3325 707/722 |
| 2015/0127652 A1* | 5/2015 | Romano | ............... | G06F 16/287 707/739 |
| 2015/0379409 A1* | 12/2015 | Hu | .......................... | G06F 16/20 706/55 |
| 2019/0102430 A1* | 4/2019 | Wang | .................... | G06F 16/367 |

OTHER PUBLICATIONS

"Difference Between URI, URL and URN," Qunituple Developers, (3 pages). [Retrieved From The Internet Oct. 1, 2019] <https://quintupledev.wordpress.com/2016/02/29/difference-between-uri-url-and-urn/>.

(Continued)

*Primary Examiner* — Robert W Beausoliel, Jr.
*Assistant Examiner* — Cheryl M Shechtman
(74) *Attorney, Agent, or Firm* — Alston & Bird LLP

(57) ABSTRACT

Document retrieval from a large document storage database may be facilitated through the use of a search system configured for identifying concepts related to a specific search query provided by a user. Prior to retrieving documents for inclusion in a listing of search results, the terms included within a user-provided search query may be expanded based on relationships between terms represented within a Resource Description Framework (RDF) triplestore to generate a semantic search query. Documents linked with one or more of the terms included within the semantic search query are identified and included within the search results.

15 Claims, 18 Drawing Sheets

(56) References Cited

OTHER PUBLICATIONS

"Enterprise Integration Patterns," Content Enricher, (3 pages). [Retrieved From The Internet Oct. 1, 2019] <https://www.enterpriseintegrationpatterns.com/patterns/messaging/DataEnricher.html>.

"Introduction to SKOS—SKOS Simple Knowledge Organization System," W3C Semantic Web, (2 pages). [Retrieved From The Internet Oct. 1, 2019] <https://www.w3.org/2004/02/skos/intro>.

"Tf-idf," Wikipedia, (6 pages). [Retrieved From The Internet 2019-19-01] <https://en.wikipedia.org/wiki/Tf%E2%80%93idf>.

"URI (Uniform Resource Identifier) Definition," (1 page), Sharpened Productions, Nov. 1, 2007. [Retrieved From The Internet Oct. 1, 2019] <https://techterms.com/definition/uri>.

"What Is NoSQL Graph Database?," Ontotext, (4 pages). [Retrieved From The Internet Oct. 1, 2019] <https://www.ontotext.com/knowledgehub/no-resourcescat/nosql-graph-database/>.

"What Is NoSQL? High-Performance, Nonrelational Databases With Flexible Data Models," AWS. [Retrieved From The Internet Oct. 1, 2019] <https://aws.amazon.com/nosql/>.

"What s RDF Triplestore?," Ontotext, (5 pages). [Retrieved From The Internet Oct. 1, 2019] <https://www.ontotext.com/knowledgehub/fundamentals/what-is-rdf-triplestore/>.

Bhogal, J. et al. "A Review of Ontology Based Query Expansion," Information Processing & Management, vol. 43, Issue 4, Jul. 2007, pp. 866-886.

Ghaffari, Parsa. "Text Analysis 101: Document Classification," KDnuggets, Jan. 2015, (5 pages). [Retrieved From The Internet Oct. 1, 2019] <https://www.kdnuggets.com/2015/01/text-analysis-101-document-classification.html>.

Kagan, M. "100 Awesome Marketing Stats, Charts, & Graphs [Data]," HubSpot, (6 pages). [Retrieved From The Internet Oct. 1, 2019] <https://blog.hubspot.com/blog/tabid/6307/bid/14416/100-awesome-marketing-stats-charts-graphs-data.aspx>.

La Barbera, V. "8 SEO Stats That Are Hard To Ignore," imFORZA Blog, (7 pages). [Retrieved From The Internet Oct. 1, 2019] <https://www.imforza.com/blog/8-seo-stats-that-are-hard-to-ignore/>.

Miles, Alistair et al. "SKOS Core Vocabulary Specification," W3C, Nov. 2, 2005, (25 pages). [Retrieved From The Internet Oct. 1, 2019] <https://www.w3.org/TR/2005/WD-swbp-skos-core-spec-20051102/>.

RDF Working Group, "Resource Description Framework (RDF)," Semantic Web Standards, Feb. 25, 2014, (3 pages). [Retrieved From The Internet Oct. 1, 2019] <https://www.w3.org/RDF/>.

Shekarpour, S. et al. "Keyword Query Expansion On Linked Data Using Linguistic and Semantic Features," In 2013 IEEE Seventh International Conference on Semantic Computing, Sep. 16, 2013, pp. 191-197. [Retrieved From The Internet Oct. 1, 2019] <http://jens-lehmann.org/files/2013/icsc_query_expansion.pdf>.

Vernon, John A. et al. "Low Health Literacy: Implications For National Health Policy," Oct. 2007, (18 pages). [Retrieved From The Internet Oct. 1, 2019] <https://hsrc.himmelfarb.gwu.edu/cgi/viewcontent.cgi?article=1173&context=sphhs_policy_facpubs>.

* cited by examiner

- Outpatient Services
  - Counseling Services
    - Financial Counseling
    - Licensed Master Social Worker
    - Personal Counseling
      - Anger Management Therapy
      - Counseling for Depression
      - Counseling for Eating Disorder
      - Counseling for Stress and Anxiety
      - Counseling for Traumatic Experience
      - Grief Counseling
      - Smoking Cessation Counseling
    - Psychotherapy
      - Cognitive Behavioral Therapy
      - Group Psychotherapy
    - Relationship Counseling
      - Family Counseling
      - > Marriage Counseling
  - Diagnostic Evaluations and Assessment
    - ADD/ADHD Testing
    - IQ Assessment
  - ECT (electro-convulsive treatment)
  - Non-Residential Substance Abuse Treatment Facili
    - Group Therapy
    - Indiviual Therapy
    - Laboratory Tests
    - Psychological Testing - Substance Abuse
  - Outpatient Detox Programs
    - Outpatient Sub-Acute Detox
  - Substance Use Assessment

FIG. 5B

> Telemental Health
> ∨ Partial Hospitalization/Intensive Outpatient Treatme
>     Intensive Outpatient Treatment
>   ∨ Partial Hospitalization/Day Treatment
>       Psychiatric Facility - Partial Hospitilization
> ∨ UBH Utilization Review
>   ∨ UBH Support Services
>       Monitor Treatment Progress
>       Resolve Problems or Concerns with Treatment

FIG. 5C

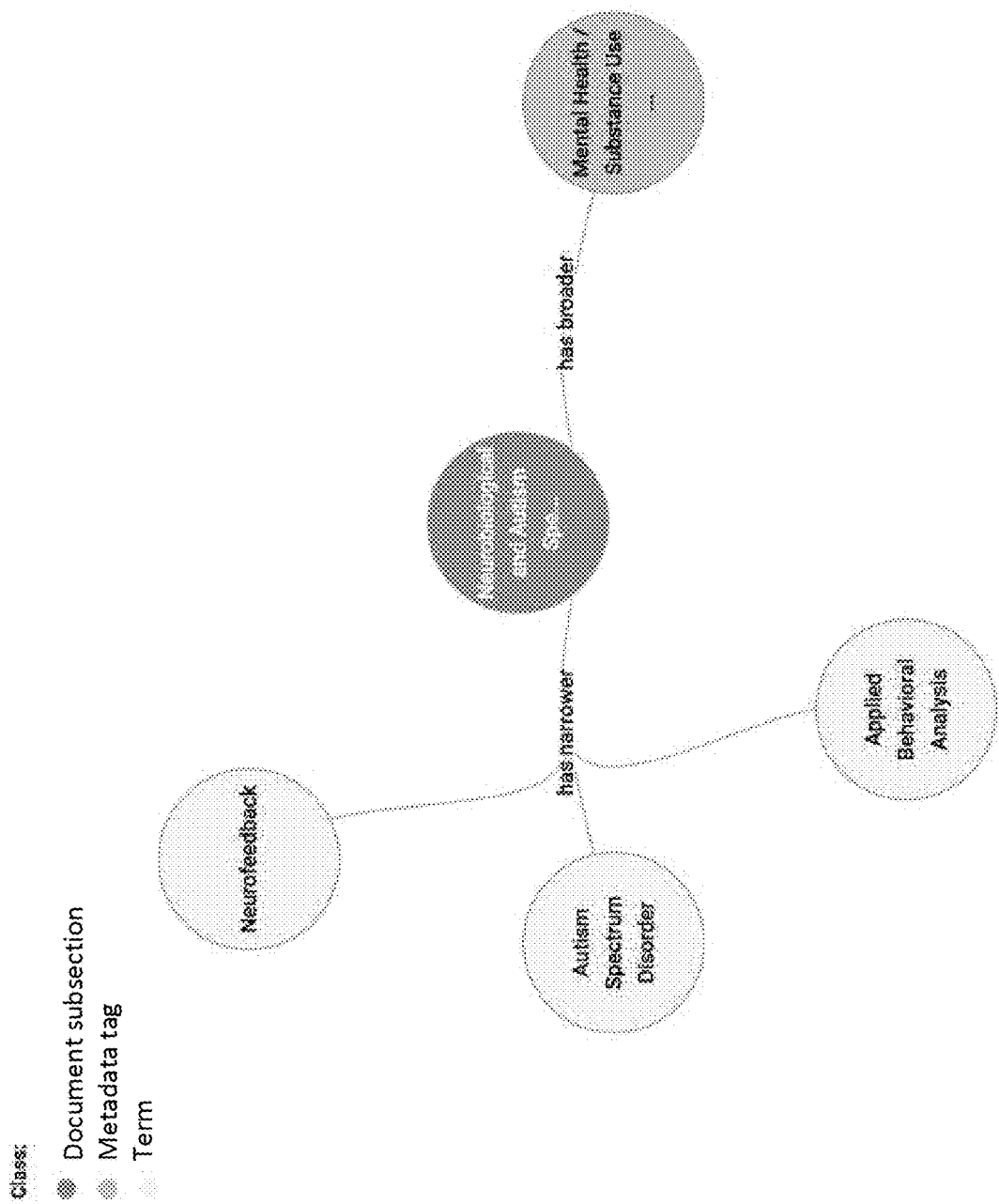

```
declare option xdmp:output "method=html";

let $title := "Short Mental Health Questions"

let $start := xs:positiveInteger(xdmp:get-request-field("start", "1"))
let $page-length := xs:positiveInteger(xdmp:get-request-field("page-length", "50"))

let $docs :=
  cts:search(/c:chat,
    cts:or-query((
      cts:word-query("mental health"),
      cts:word-query("substance use disorder"),
      cts:word-query("inpatient commitment"),
      cts:word-query("cap"),
      cts:word-query("detox"),
      cts:word-query("halfway house"),
      cts:word-query("three-quarter house"),
      cts:word-query("wilderness camp"),
      cts:word-query("psychiatric facility"),
      cts:word-query("therapeutic foster care"),
      cts:word-query("autism spectrum disorder"),
      cts:word-query("autism treatment")
    ))
  )
```

| Class | Category | Score |
|---|---|---|
| | Applied Behavioral Analysis | 1.00 |
| | Psychological Evaluation | 1.00 |
| | Neurobiological and Autis... | 1.00 |
| | Partial Hospitalization/Int... | 1.00 |
| | Mental Health / Substanc... | 1.00 |
| | Outpatient Services | 1.00 |
| | Partial Hospitalization/Da... | 1.00 |
| | Autism Spectrum Disorder | 1.00 |
| | Brain Stimulation Therapies | 0.98 |

FIG. 11

AUTOMATED CONCEPTS FOR INTERROGATING A DOCUMENT STORAGE DATABASE

CROSS-REFERENCE TO RELATED APPLICATIONS

This patent application claims priority to U.S. Provisional Appl. Ser. No. 62/568,847, filed Oct. 6, 2017, which is incorporated herein by reference in its entirety.

BACKGROUND

Entities are constantly attempting to provide information about goods and services in a user-friendly, easy-to-understand format for customers of the entity. Accordingly, a need constantly exists for informational sources configured to provide easily locatable information for users, regardless of a user's knowledge level on a particular topic.

BRIEF SUMMARY

Various embodiments are directed to a semantic-based interrogation system for retrieving documents or portions of documents in response to a query provided by a user and a corresponding database storage structure enabling expanded functionality of the interrogation system. Data stored within the data storage structure may be periodically updated to provide more relevant semantic search capabilities by providing up-to-date links between particular terminology that may relate to the user's query (e.g., thereby providing a semantic search strategy based on a user's query) and specific stored documents (e.g., via a document classification mechanism) to be provided in response to the user's query. These updates may be provided via any of a variety of methodologies, such as machine-learning based methodologies, to constantly update the informational ontology to provide additional informational relationships between various information types to ease system navigation between terminology and stored documents or portions of documents within the database storage structure.

Certain embodiments are directed to a computer-based database interrogation system for retrieving documents or portions of documents from a document storage database. In certain embodiments, the database interrogation system comprises: a document storage database storing a plurality of documents with a plurality of associated topical metadata tags, wherein at least a portion of the plurality of documents are stored with subsection specific metadata tags associated with discrete subsections of content within a document; a graphical ontology data storage area storing plurality of terms and a plurality of nodes representative of logical relationships between terms stored therein; wherein at least a portion of the terms stored within the graphical ontology data storage area are linked with corresponding documents stored within the document storage database; and a processing system configured to: receive, from a user computing entity, a user-provided search query for documents, wherein the user-provided search query comprises one or more seed terms; expand the user-provided search query to generate a semantic search query comprising expanded search terms and the seed terms, based on logical relationships identified between the seed terms and additional terms represented within the graphical ontology data storage area; identify relevant documents of the plurality of documents stored within the document storage database linked with at least one of the expanded search terms or the seed terms; and generate a search result graphical user interface comprising data representing the relevant documents.

In certain embodiments, identifying relevant documents of the plurality of documents stored within the document storage database comprises identify subsection-specific metadata tags associated with relevant discrete subsections of content within a document that are linked with at least one of the expanded search terms of the semantic search query; and generating a search result graphical user interface comprises including data representing the identified relevant discrete subsections of content within a document. Moreover, the graphical ontology data storage area is within the document storage database. The plurality of nodes of the graphical ontology data storage area of certain embodiments are Resource Descriptive Framework (RDF) triples, wherein each RDF triple comprises two terms and a predicate indicative of a relationship between the two terms.

Moreover, the processing system may be further configured to rank the identified relevant documents based on relevance to the user-provided search query. The processing system may also be configured to transmit the search results graphical user interface to the user computing entity.

Certain embodiments are directed to a computer-implemented method for retrieving documents from a document storage database. In certain embodiments, the method comprises: storing, within a document storage database, a plurality of documents with a plurality of associated topical metadata tags, wherein at least a portion of the plurality of documents are stored with subsection specific metadata tags associated with discrete subsections of content within a document; storing, within a graphical ontology data storage area, plurality of terms and a plurality of nodes representative of logical relationships between terms stored therein, wherein at least a portion of the terms stored within the graphical ontology data storage area are linked with corresponding documents stored within the document storage database; receiving a user-provided search query for documents, wherein the user-provided search query comprises one or more seed terms; expanding the user-provided search query to generate a semantic search query comprising expanded search terms and the seed terms, based on logical relationships identified between the seed terms and additional terms represented within the graphical ontology data storage area; identifying relevant documents of the plurality of documents stored within the document storage database linked with at least one of the expanded search terms or the seed terms; and generating a search result graphical user interface comprising data representing the relevant documents.

In various embodiments, identifying relevant documents of the plurality of documents stored within the document storage database comprises identify subsection-specific metadata tags associated with relevant discrete subsections of content within a document that are linked with at least one of the expanded search terms of the semantic search query; and generating a search result graphical user interface comprises including data representing the identified relevant discrete subsections of content within a document. The graphical ontology data storage area of certain embodiments is within the document storage database. Moreover, the plurality of nodes of the graphical ontology data storage area of certain embodiments are Resource Descriptive Framework (RDF) triples, wherein each RDF triple comprises two terms and a predicate indicative of a relationship between the two terms.

The method may further comprise steps for ranking the identified relevant documents based on relevance to the user-provided search query. The method may also comprise steps for transmitting the search results graphical user interface to the user computing entity. Moreover, in various embodiments, storing a plurality of terms and a plurality of nodes representative of logical relationships between terms stored therein comprises: identifying logical relationships between the topical metadata tags and one or more terms within a customer service interaction transcript; and constructing one or more of the plurality of nodes to represent the logical relationships identified between the topical metadata tags and the one or more terms within the customer service interaction transcript.

Certain embodiments are directed to a computer program product comprising a non-transitory computer readable medium having computer program instructions stored therein, the computer program instructions when executed by a processor, cause the processor to: store, in a document storage database, a plurality of documents with a plurality of associated topical metadata tags, wherein at least a portion of the plurality of documents are stored with subsection specific metadata tags associated with discrete subsections of content within a document; store, in a graphical ontology data storage area, a plurality of terms and a plurality of nodes representative of logical relationships between terms stored therein, wherein at least a portion of the terms stored within the graphical ontology data storage area are linked with corresponding documents stored within the document storage database; and receive, from a user computing entity, a user-provided search query for documents, wherein the user-provided search query comprises one or more seed terms; expand the user-provided search query to generate a semantic search query comprising expanded search terms and the seed terms, based on logical relationships identified between the seed terms and additional terms represented within the graphical ontology data storage area; identify relevant documents of the plurality of documents stored within the document storage database linked with at least one of the expanded search terms or the seed terms; and generate a search result graphical user interface comprising data representing the relevant documents.

In certain embodiments, identifying relevant documents of the plurality of documents stored within the document storage database comprises identify subsection-specific metadata tags associated with relevant discrete subsections of content within document that are linked with at least one of the expanded search terms of the semantic search query; and generating a search result graphical user interface comprises including data representing the identified relevant discrete subsections of content within a document.

In certain embodiments, the graphical ontology data storage area is within the document storage database. In certain embodiments, the plurality of nodes of the graphical ontology data storage area are Resource Descriptive Framework (RDF) triples, wherein each RDF triple comprises two terms and a predicate indicative of a relationship between the two terms.

Moreover, in certain embodiments the non-transitory computer readable storage medium further stores computer program instructions configured to, when executed by a processor, cause the processor to rank the identified relevant documents based on relevance to the user-provided search query. In other embodiments, the non-transitory computer readable storage medium further stores computer program instructions configured to, when executed by a processor, cause the processor to transmit the search results graphical user interface to the user computing entity. In various embodiments, storing a plurality of terms and a plurality of nodes representative of logical relationships between terms stored therein comprises: identifying logical relationships between the topical metadata tags and one or more terms within a customer service interaction transcript; and constructing one or more of the plurality of nodes to represent the logical relationships identified between the topical metadata tags and the one or more terms within the customer service interaction transcript.

BRIEF DESCRIPTION OF THE SEVERAL VIEWS OF THE DRAWINGS

Reference will now be made to the accompanying drawings, which are not necessarily drawn to scale, and wherein:

FIGS. 5A-5C collectively illustrate an example document storage tree including additional metadata according to one embodiment of the present invention.

FIGS. 7A-7C illustrate example relationships between terms stored within an ontology data storage area according to one embodiment of the present invention.

FIG. 8 illustrates an example search query to identify customer service interactions usable to further populate the ontology data storage area according to one embodiment of the present invention.

FIG. 9 illustrates an example customer service chat log including a transcript of a customer service interaction with terminology usable to further populate the ontology data storage area according to one embodiment of the present invention.

FIG. 10 illustrates an example customer service interaction search interface usable to identify terminology to add to an ontology data storage area according to one embodiment.

FIG. 11 illustrates example relevance scores for terms identified in constructing a semantic search query according to one embodiment of the present invention.

DETAILED DESCRIPTION

Figure 1:
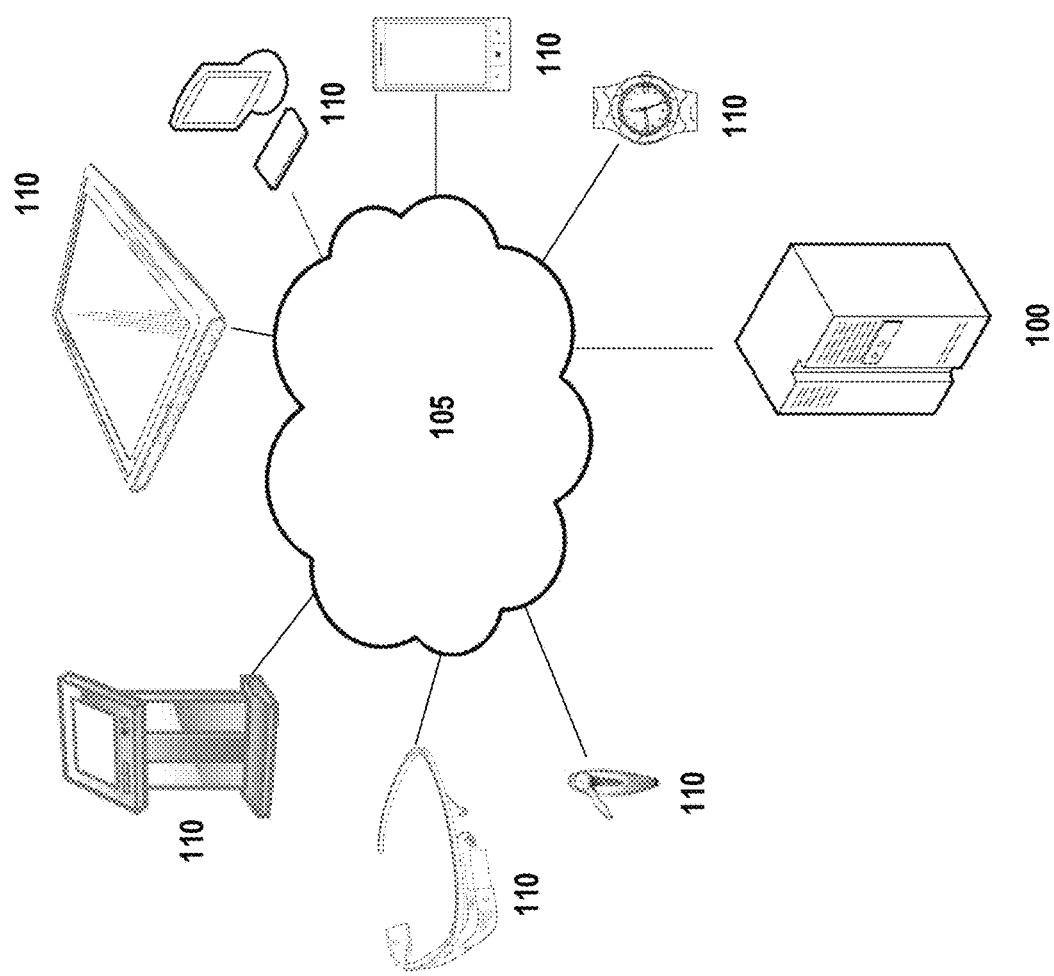
FIG. 1 is an overview of a system that can be used to practice embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so

I. Overview

As just one example, terminology ontology concepts discussed herein may be utilized in coordination with a document storage database and a document search system to provide expanded, relevant search results in response to a relatively simple user-provided search query. The search system thereby provides semantic-based search strategies for selecting results to be provided to a user. Such concepts may be particularly useful for medical care providers, medical care payers, and/or the like, to help potential patients and/or customers locate relevant documentation about various medical conditions, procedures, medical insurance coverages, and/or the like—any of which may be known by a plurality of terms to various individuals (e.g., a computed tomography scan may be also be known as, or otherwise referred to as (regardless of accuracy) a CT scan, a CAT scan, an MRI, or any of a variety of other terms). The terminology ontology may be embodied as graphically-stored data indicative of semantic relationships between various terms, which may be stored in a graphical ontology data storage area maintained by a management computing entity configured to monitor various disparate informational sources (e.g., third party information sources, customer chat logs, and/or the like) to provide additional information linkages between information stored within the graphical ontology data storage area based on real-time data regarding users' interactions with the management computing entity and other informational sources. In certain embodiments, the ontology data storage area representing the terminology ontology may overlap with or may be coextensive with a document storage database. Thus, the graphically-stored terminology ontology may be utilized by a search system of the management computing entity to navigate through various terms and/or documents stored within corresponding storage areas to identify documents deemed relevant to a user's search query.

The terminology ontology may be particularly useful in combination with computer-based storage systems, such as physical-memory-based databases configured for storing a plurality of documents (e.g., embodied as data files) in accordance with a defined storage taxonomy. For example, beyond direct parent—child relationships between stored documents, a storage structure established within database storage implementations provides little information about the type of content contained within each stored document, and therefore traditional search schemes implemented for querying such database storage structures provide minimal contextual searching functionality, that is generally limited to pure key-word searches to match a user's provided search string to identical strings within the stored documents.

When implemented with database storage configurations, the terminology ontology configuration discussed herein significantly expands the contextual and/or semantic searching capability of the search system when traversing the database through the use of the terminology ontology data (defining graphical relationships between data), which may be embodied as Resource Description Framework (RDF) triples that provide both additional information about the documents themselves and relational predicates describing relationships between multiple documents, multiple terms, and/or the like. In other embodiments, the terminology ontology data may be embodied as labeled property graphs to establish relationships between various terms. Through the implementation of terminology ontology configurations as discussed herein, databases are able to automatically return documents and/or information relevant to user-provided search terms, as well as documents and/or information relevant to synonyms, aliases, similar terms, related concepts, and/or the like having a stored relationship with the user-provided search terms.

The terminology ontology itself (e.g., the graphical storage structure) may encompass ontology data such as individually stored documents, individual database entries, metadata stored in association with other documents, and/or the like stored in accordance with a graphical storage structure in the database, and/or the like. The ontology data is made accessible to a search system with established links between terms of the ontology data and relevant documents that may be returned to a user interface as search results.

The ontology data may be built and/or provided via any of a variety of mechanisms, such as via machine-learning, artificial intelligence, and/or the like. As just one example, when constructing the ontology data that may be stored in the ontology data storage area, ontology build aspects of the management computing entity may be configured to crawl one or more data sources, such as one or more defined internet-based sources (e.g., public informational sources and/or private informational sources), customer-service chat logs (e.g., anonymized customer-service chat logs of a healthcare payer, of a healthcare provider, and/or the like), and/or the like. Thus, the management computing system may be configured to identify accurate, inaccurate, slang, short-hand, and/or other terminology that various individuals may utilize to refer to a particular concept. The management computing entity may be configured to identify known terminology (e.g., terminology already reflected in the ontology data) within the data sources, and to identify additional terminology/data deemed relevant to the known terminology (e.g., "MRI" may be identified as relevant to CT scans because certain individuals may inaccurately utilize these terms interchangeably). The newly identified terminology/data may then be added to the information ontology data together with information/data indicative of determined relationships with existing data stored therein.

Moreover, stored documents of various embodiments are subdivided and/or classified into searchable document subsections, such that specific document subsections may be returned as search results to a particular search. As a specific example, where documents are embodied as electronic documents comprising human-readable text, document subsections may be embodied as individual paragraphs, sections having associated subheadings, sentences, words, cells, and/or the like. Each subsection may be associated with metadata establishing links with terms of the ontology data, thereby enabling those individual sections to be returned as search results in response to a user-provided search.

1. Technical Problem to be Solved

Existing database storage systems are generally associated with limited capabilities for contextual searching of stored documents and/or document subsections that are stored within the database storage system. For example, existing search capabilities for database storage systems are generally limited to pure keyword searching, which is accomplished by traversing data files stored within a database to identify exact matches between a search string provided by a user and identical strings within the stored data. For example, a search for the string: "APPILED BEHAVIOR ANALYSIS" would only return search results for the same phrase, inclusive of the misspelling of the word "APPLIED" that was included within the search string. This search would likely return minimal search results (or none) due to the inclusion of the typographical error. Even with proper spelling in the search string, the search results would omit relevant related terms, such as "APPLIED BEHAVIORAL ANALYSIS," "ABA," "MENTAL HEALTH," and/or the like.

Various embodiments discussed herein are configured to improve the search capabilities of a document storage database to provide relevant and useful search results in response to a user-provided search query beyond exact key-word matches. As a result, users are provided with useful search results that satiate the user's initial search query with minimal searching effort, even if the user does not have a full understanding of all concepts that may be related to a particular search query. Such configurations may be particularly useful when implemented in environments or industries plagued with misinformation and/or a severe knowledge deficit among users or members. In the healthcare industry for example, health insurance members may have minimal knowledge about procedures, conditions, pharmaceuticals, treatment options, industry terminology, and/or the like that may be relevant to them, and therefore database searches to obtain additional information about a particular topic may be a primary source of additional information for those users.

2. Technical Solution

To improve the functionality of computer-based search mechanisms for document storage databases, various embodiments provide both new data types to be stored in association with (e.g., linked with to provide classification for) stored documents and/or document subsections; and new data storage structures establishing useful links between ontology data and the stored documents and/or document subsections. These new data types and data storage structures are accompanied by a new search system configuration reliant on the new data types and data storage structures to provide improved search results in response to a user's search query.

The ontology data may be stored in an ontology data storage area via a graphical data storage structure interwoven with (e.g., with defined links) a document storage system (e.g., a graphical document storage system) of a database that utilizes RDF triples to establish links between various ontology data. The ontology data comprises data indicative of relationships between a plurality of terms and is stored in association with the underlying document storage database. The ontology data is accessible to integrated search systems, thereby enabling the search systems to identify concepts deemed relevant to a particular search query (e.g., search term, search phrase, and/or the like) provided via user input, and to extract documents and/or document subsections linked with those related concepts for presentation within a search results user interface. For example, the ontology data may be stored within the document storage database.

Such configurations thereby increase the amount of data that may be returned from a data storage area in response to a search query by establishing graphically-stored ontology data that provides relationships between various data that may be traversed to identify related data to be returned from the data set.

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

Figure 2:
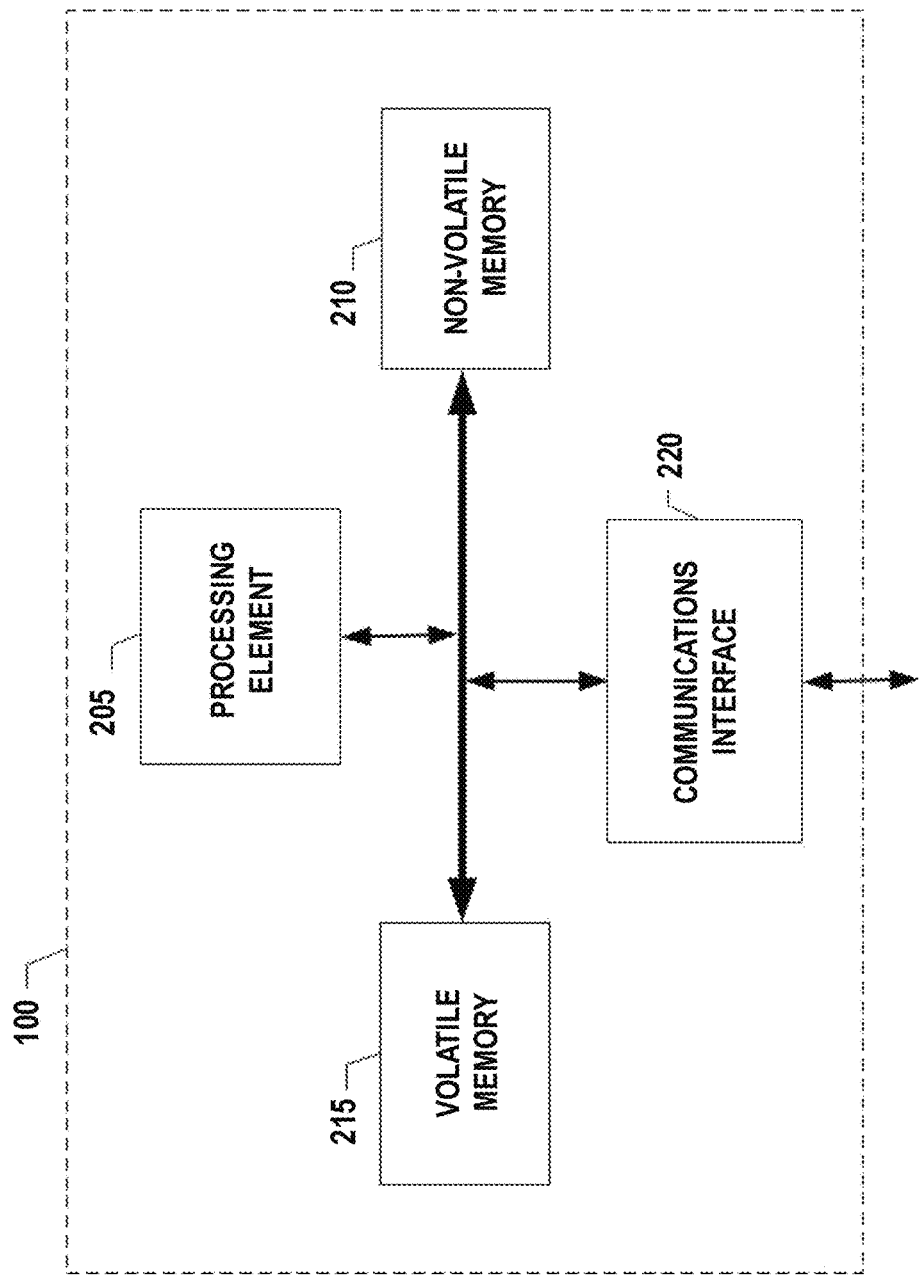
FIG. 2 is an exemplary schematic diagram of a management computing entity according to one embodiment of the present invention.

FIG. 1 provides an illustration of an exemplary embodiment of the present invention. As shown in FIG. 1, this particular embodiment may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.
1. Exemplary Management Computing Entity FIG. 2 provides a schematic of a management computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
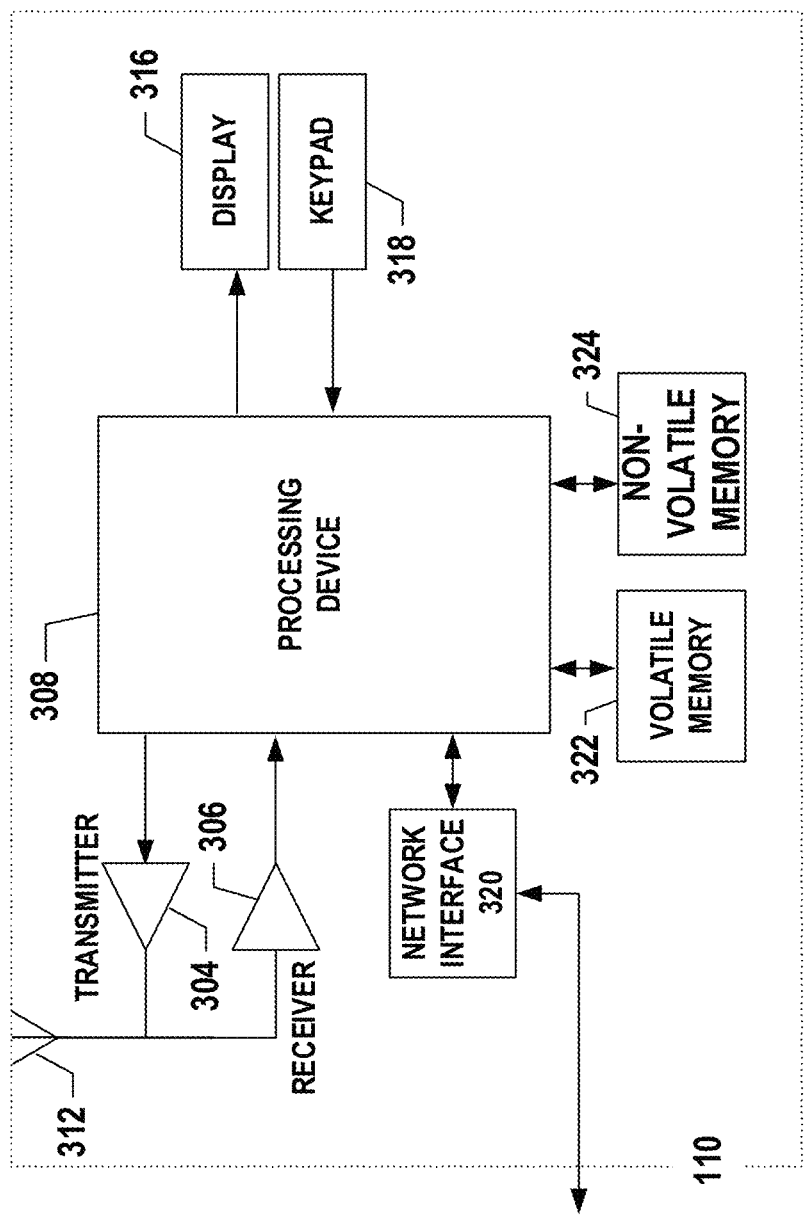
FIG. 3 is an exemplary schematic diagram of a user computing entity according to one embodiment of the present invention.

A user may be an individual, a family, a company, an organization, an entity, a department within an organization, a representative of an organization and/or person, and/or the like. To do so, a user may operate a user computing entity 110 that includes one or more components that are functionally similar to those of the management computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

IV. System Functionality

Various embodiments are directed to systems and methods for implementing a document storage database with associated ontology data stored in a graphical database format for establishing relationships between various stored data (in either the document storage context or the ontology data context) to provide expanded search capabilities for traversing the document storage database and providing relevant search results in response to a user's search query.

1. Document Storage

As discussed herein, various embodiments provide increased functionality and search capabilities for document storage databases, thereby easing the processes for locating desired information within individual documents stored in the document storage databases. Such embodiments are particularly beneficial in environments or industries in which users of a search platform may have a limited understanding of the concepts described in the stored documents. As a particularly relevant example, various embodiments may be implemented to aid healthcare patients, health insurance beneficiaries, and/or the like locate desired information within a collection of healthcare-related documentation stored within a document storage database. Healthcare documentation is typically written for an audience that has a detailed understanding of the functionality of the healthcare industry, and often uses detailed, industry specific terminology not known to the general public. Thus, the described configurations enable users to search for a particular healthcare term using a more common vernacular, while still obtaining the desired search results.

As discussed herein, documents may be embodied as individual data files or portions of data files. The documents may comprise textual data (e.g., alphanumeric data) presented in a human-readable format when presented to a user via a user interface. The documents may be presented in any of a variety of file formats, such as .PDF, .DOC, .DOCX, .XLS, .XLSX, .TXT, .RTF, .PPT, .PPTX, and/or the like. In various embodiments, the contents of a particular document may be accessible via a dedicated computing program application (e.g., Microsoft® Word, Adobe® Reader, and/or the like), however the contents of various documents may be readable/accessible via a search system of a management computing entity 110 as discussed herein as well, such that the search system may compare requested search queries against the substantive contents of individual documents to identify relevant search results.

Figure 4:
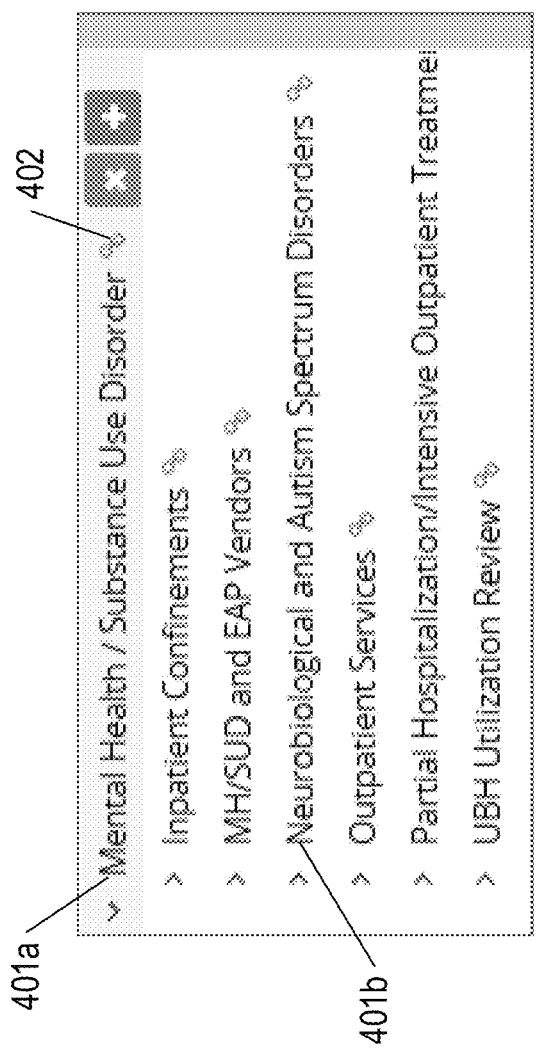
FIG. 4 is an example of a document storage tree according to one embodiment of the present invention.
Figure 5A:
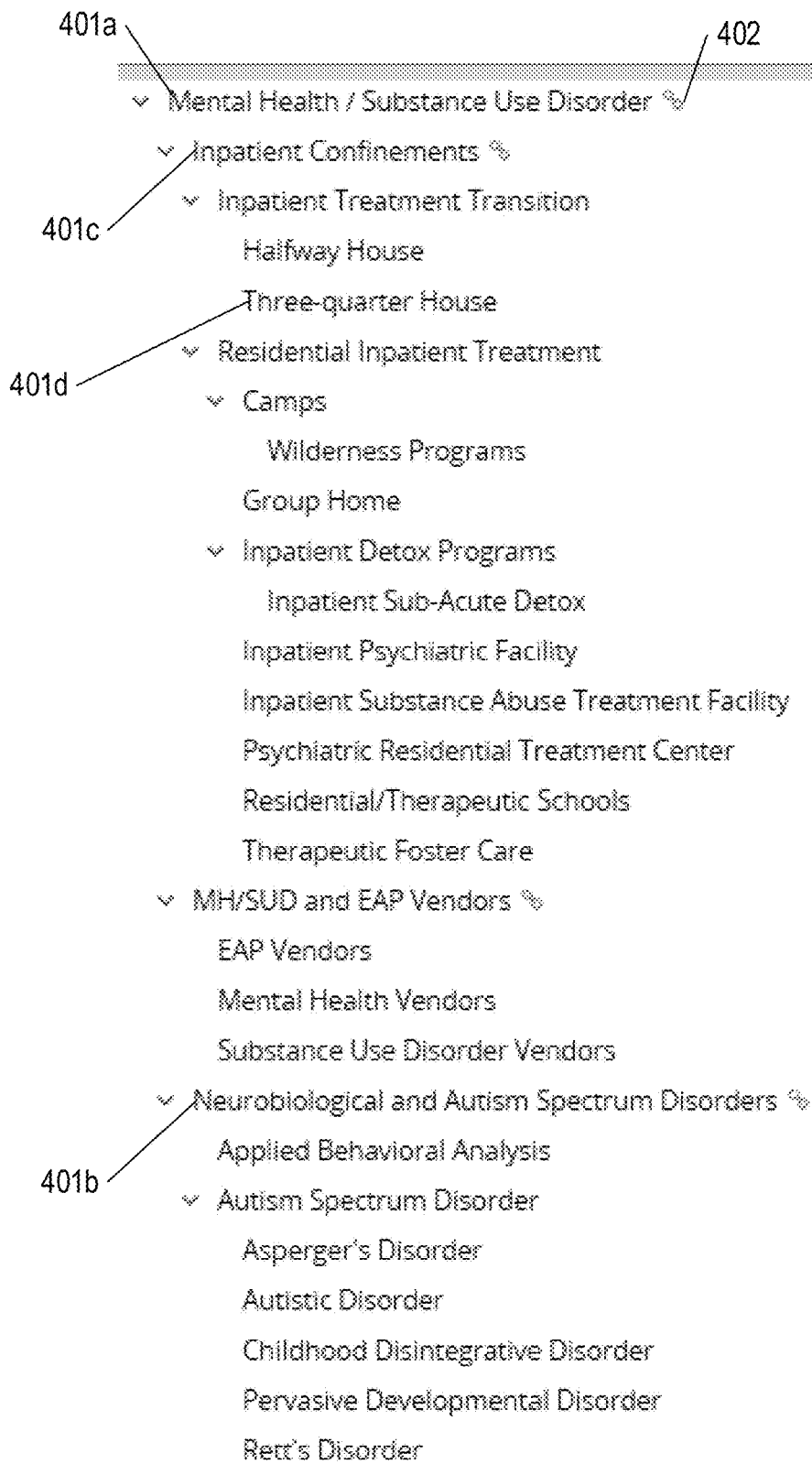

In various embodiments, the individual documents may be stored in association with metadata tags, which may be assigned by a classification system/server of the management computing entity 100 and may provide additional data regarding the contents of a particular document. The metadata tags may identify a document title, an edit date, an enforcement date, a contents listing (which may be embodied as a plurality of metadata tags in certain embodiments), a brief description of the contents, a reference code, one or more descriptive terms, and/or the like. Thus, the metadata tags may classify the documents (or document subsections). Moreover, metadata tags may be usable by the document storage database to maintain relationships between documents within the document storage database. As just one example that will be explained in greater detail herein, metadata tags may associate particular documents with labeled document storage locations within a document storage tree according to a taxonomy of the document storage tree. An example portion of a document storage tree usable within the healthcare industry as shown in FIG. 4. As shown therein, document storage locations 401 according to certain embodiments may be provided in a hierarchical fashion, with first level document storage locations 401a and second level document storage locations 401b nested within the first level document storage locations 401a. Moreover, these document storage locations are associated with document storage location titles/classifications (e.g., "Mental Health/ Substance Use Disorder" or "Neurobiological and Autism Spectrum Disorders"), which may be provided as metadata tags associated with particular documents, thereby tying a particular document with a particular document storage location. Moreover, in connection with later discussions, it should be noted that in the illustration shown in FIG. 4, each document storage location 401 is associated with a link symbol 402 distinguishing document storage locations from other metadata (e.g., descriptive terms, aliases, and/or the like). These other metadata types may be further distinguishable from the document storage locations 401 from other distinguishing features, such as the data storage level within the data storage structure—these other metadata types may be provided as third level data (or lower level), nested within second level data. FIGS. 5A-5C illustrate an expanded document storage tree including additional third level data 401c and fourth level data 401d providing additional metadata to be associated with documents stored within document storage locations of the first level 401a and second level 401b metadata within the document storage tree.

The metadata tags may be accessible to a search system, such that search results may be based on metadata tags within the document storage tree, classifying metadata tags associated with the document, and/or searchable contents of the documents themselves.

At least a portion of the metadata tags may be configured for presentation in human-readable format, for example, when presenting the document to a user as a search result. For example, a document title, edit date, enforcement date, and one or more descriptive terms that were determined to match a user's search query (e.g., either directly match or match based on identified related terms, as discussed herein) may be displayed as a portion of a search result user interface. Other metadata tags, such as a reference code, other descriptive terms deemed not to match a user's search criteria, and/or the like, may not be displayed.

Figure 6:
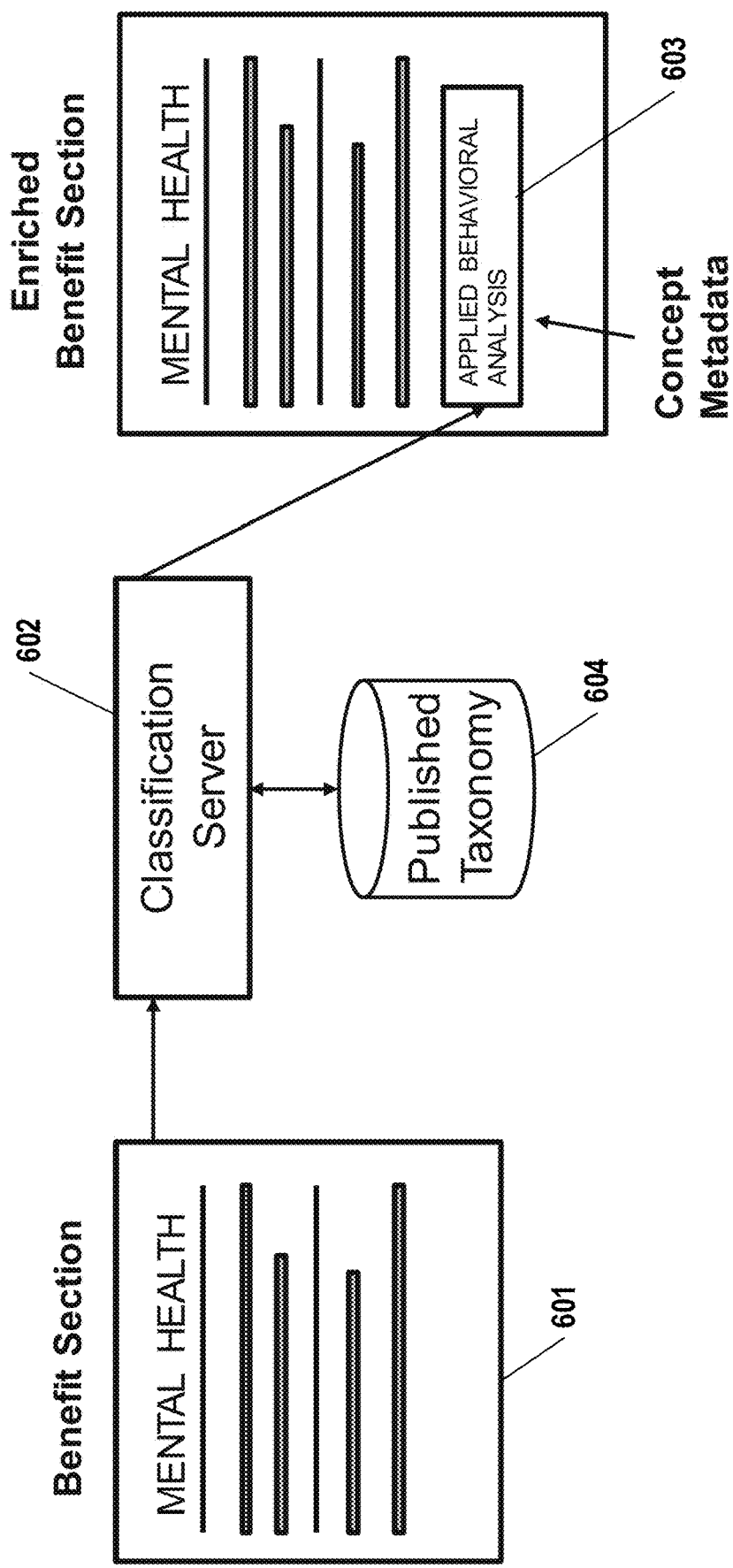
FIG. 6 is a schematic diagram illustrating steps for adding metadata to a document according to one embodiment of the present invention.

FIG. 6 graphically illustrates the metadata assignment process performed by a classification server on a document embodied as a healthcare benefits document relating to Mental Health. As shown therein, the classification server 602 of the management computing entity 100 intakes the benefits document 601, and assigns metadata tags 603 to the benefits document 601 based at least in part on data 604 indicative of a taxonomy of document storage locations within a document storage tree. As discussed in greater detail herein, the classification server 602 may be further configured to assign metadata tags 603 based on other data sources, such as ontology data stored within an ontology data storage area.

The documents may be stored in a document storage database accessible via one or more networks. These documents may be stored via any of a variety of database architectures, although preferred embodiments utilize a graphical taxonomy style of data storage within the database. The relationships within the document storage database may be established independently of the documents themselves, and may be embodied as a document storage tree identifying a graphical listing of concepts to be included in the database, wherein each concept within the data storage tree is associated with a storage location. Individual documents (or portions of documents) may be stored as documents associated with each of the plurality of storage locations within the document storage tree. As just one example embodiment, the graphical relationships, inclusive of data tags associated with each data storage location within the data storage tree, may be imported from an external data source (e.g., an external data storage location accessible to the management computing system 100).

In other embodiments, documents may be subdivided into topically discrete document subsections. In certain embodiments, each document subsection may be associated with a particular subtitle indicative of the contents of the document subsection. However, document subsections need not be visually subdivided within a document, for example, with subtitles. Document subsections may be embodied as discrete paragraphs within a document, discrete sentences within a document (e.g., discrete sentences within a paragraph), discrete words within a document (e.g., discrete words within a sentence), and/or the like.

As discussed in greater detail herein, subsections within a document may be associated with metadata tags, such as those discussed above in reference to particular document. For example, metadata tags associated with document subsections may identify a subsection title, an edit date, an enforcement date, a contents listing (which may be embodied as a plurality of metadata tags in certain embodiments), a brief description of the contents, a reference code, one or more descriptive terms, and/or the like. The metadata tags may be accessible to a search system as discussed in greater detail herein, such that search results may be based on data tags within the document storage tree, metadata tags associated with document subsections, and/or searchable contents of the document subsections themselves.

Documents may be divided into subsections manually or automatically. As just one example, administrative users may manually subdivide documents by placing bookmarks, section breaks, and/or other electronic document dividers within the documents. In other embodiments, documents may be automatically subdivided based on one or more machine-learning or artificial intelligence algorithms. As a specific example, particular portions of a document that are commonly read by users (e.g., which may be determined by tracking the displayed portion of a document visible within a graphical display of the user computing entity 110) may be discretely separated as subsections of a document. As another specific example, subsections having a high density of one or more identified terms may be discretely identified as document subsections. It should be understood that any of a variety of methodologies may be utilized for subdividing documents into subsections.

In certain embodiments, both a document and one or more subsections of the document may be associated with a particular storage location within the document storage tree. In such instances, both the document (as a whole) and the one or more document subsections may be returned as search results when the particular search location is identified as a relevant search result for a user's search query.

2. Metadata Tags

As discussed herein, documents and/or document subsections stored within the document storage database may have one or more metadata tags associated therewith. At least a portion of these metadata tags are accessible to a search system as discussed herein, such that search results to a user-provided search query may be identified based at least in part on the searchable metadata tags associated with the documents, document subsections, and/or the like. Although at least a portion of these metadata tags are searchable, these metadata tags may not be shown in search results in certain embodiments. In other embodiments however, at least those metadata tags determined to be relevant to a particular search query may be shown in a user display interface providing search results to the user.

Those metadata tags may be assigned to documents using any of a variety of methodologies. As just one example, metadata tags may be assigned to documents and/or document subsections manually. For example, an administrative user may read relevant documents and assign one or more descriptive terms as metadata tags for the document. As yet another example, metadata tags may be assigned to documents and/or document subsections automatically. Specifically, documents and/or document subsections may be reviewed via machine learning algorithms, artificial intelligence algorithms, and/or the like to determine relevant descriptive terms to be assigned to the documents and/or document subsections. As just one example, the management computing system 100 may be configured to intake each document to be stored within the document storage database, to read the contents of the document (e.g., with optical-character-recognition algorithms), and apply a Term-frequency-Inverse-document-frequency (Tf-Idf) algorithm to identify relevant terms within each document and/or document subsection that are determined to be most descriptive of the contents of the document. As those of skill in the art recognize, a Tf-Idf algorithm may be utilized to determine descriptive terms for individual documents and/or document subsections within an analyzed aggregated collection of a plurality of documents. The Tf-Idf algorithm may be configured to identify terms utilized relatively infrequently within the aggregated collection of documents, but used relatively frequently within a single document or document subsection. An application of a Tf-Idf algorithm assumes that these terms (e.g., used frequently within a single document but infrequently within a collection of a plurality of documents) are strong indicators of the topics discussed within the document or document subsection.

As yet another example of an automated methodology for assigning metadata tags to a particular document or document subsection, customer service interaction transcripts (e.g., online chat transcripts or telephonic interaction transcripts) may be reviewed to identify relevant terms discussed within those interactions (e.g., utilizing a Tf-Idf algorithm), and to identify documents or document subsections explicitly referenced in relation to the identified relevant terms of the interactions. Those relevant terms may then be assigned as descriptive metadata tags to the documents and/or document subsections.

In certain embodiments, metadata tags may be assigned to particular locations within a document storage tree instead of or in addition to assigning metadata tags to particular documents. For example, as indicated at FIGS. 5A-5C, a plurality of metadata tags (indicated at third level 401c and fourth level 401d locations within the document storage tree) may be nested within a particular document storage location 401a, 401b. As discussed herein, these metadata tags may be identified based on one or more external informational sources, and may be stored as entries within the document storage tree nested within entries having corresponding document storage locations.

3. Search System

As discussed herein, the search system functionality may be carried out by the management computing entity 100 and is configured for providing users with search results deemed relevant to a user provided search term by utilizing a semantic search comprising expanded search terms identified within a relevant database. Data demonstrating relationships between various search terms that may be utilized to identify relevant expanded search parameters may be stored within the document storage database and/or an ontology data storage area accessible to the search system.

a. Terminology Storage

Relationships between various terminology is stored and accessible to the search system to increase the effectiveness of the search system. These relationships are representative of a terminology ontology that provides additional information regarding various terms that may be used to identify relevant, related terms within a search to provide additional relevant search results to a user. By identifying relationships between various terms, the search system significantly increases the likelihood that users will locate documents of interest via the search interface regardless of vernacular used by the users within search queries.

Terminology included within a graphical ontology data storage area may be stored according to a Simple Knowledge Organization System (SKOS) to represent knowledge organization systems. Specifically, a plurality of terms may be stored in a semantic graph database structure, utilizing a Resource Description Framework (RDF) triplestore configuration for identifying ontology relationships between various pairs of terms. Utilizing the RDF framework, pairs of terms are stored in a single data record (e.g., a node) known as a triple (referring to the inclusion of two terms and a predicate) together with predicate data indicating the relationship between these terms. As examples, the predicate data may indicate that a first term is an "alias for" a second term; a first term is an "example of" a second term; a first term is a "treatment for" a second term; and/or the like. In certain embodiments, predicates may be selected from a predefined listing of standardized predicates that may be utilized within triples, or predicates may be generated and assigned uniquely for each pair of related terms. It should be understood that the former embodiment, in which a standardized listing of predicates are available for inclusion within triples, may facilitate later interactions between the search system and the stored terminology to enable the search system to distinguish between predicates indicative of relevant relationships between terms (based on a user-provided search term) and predicates indicative of irrelevant relationships between terms.

Figure 7B:
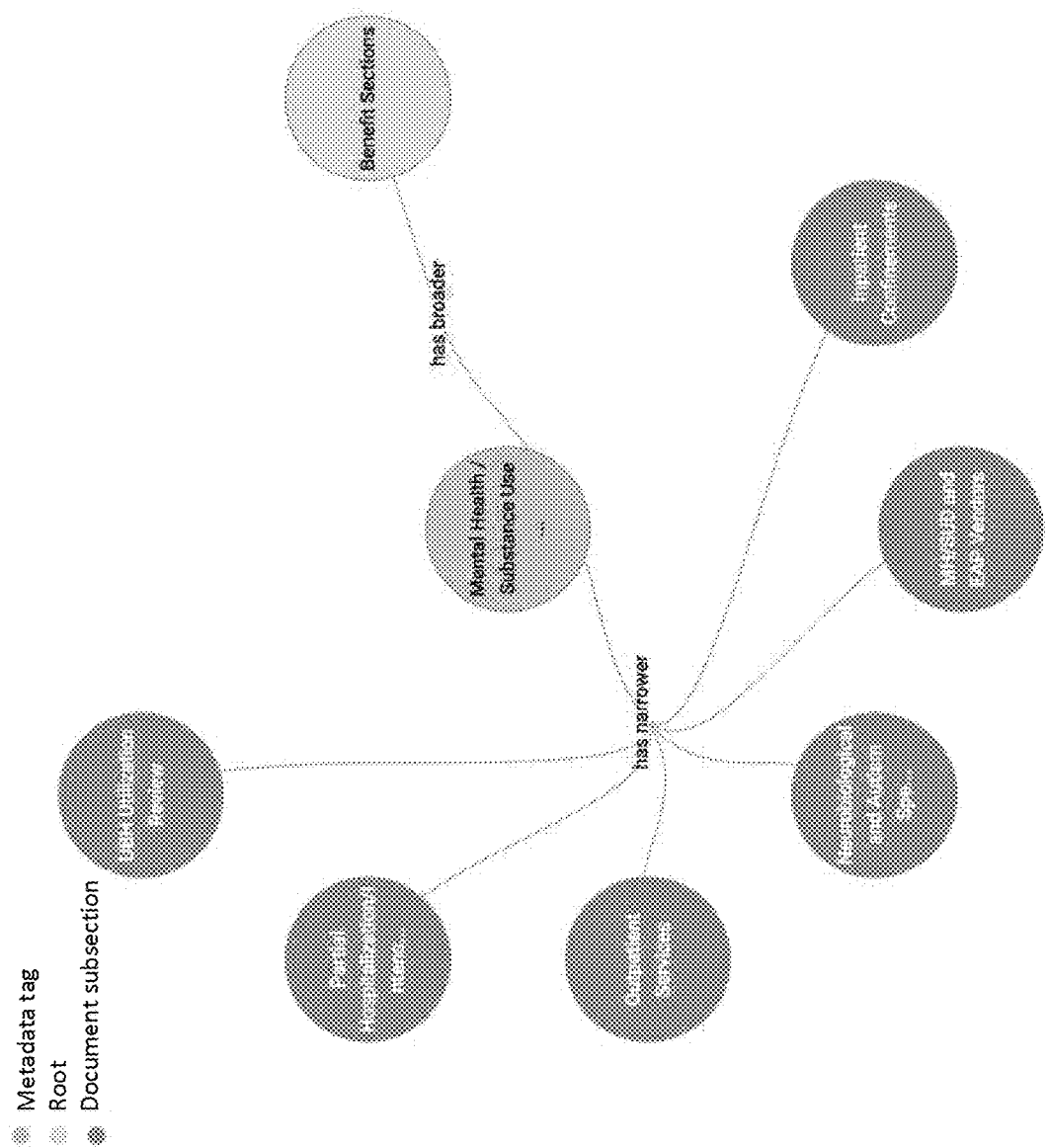

In certain embodiments, a single term may be included in a plurality of nodes, such that the graphical ontology data storage area may resemble a graphical mesh of terminology, similar to that shown in FIG. 7A-7B, which illustrates a plurality of terms ("Neurofeedback;" "Autism Spectrum Disorder;" and "Applied Behavior Analysis" as being associated with a document subsection "Neurobiological and Autism Spe . . . " which is in turn related to a metadata tag "Mental Health/Substance Use . . . " and a broader term "Benefits Sections" (indicating a highest level of generality for the hierarchical document storage area). Predicates linking each of the nodes shown in FIGS. 7A-7B are shown between individual nodes.

Figure 7C:
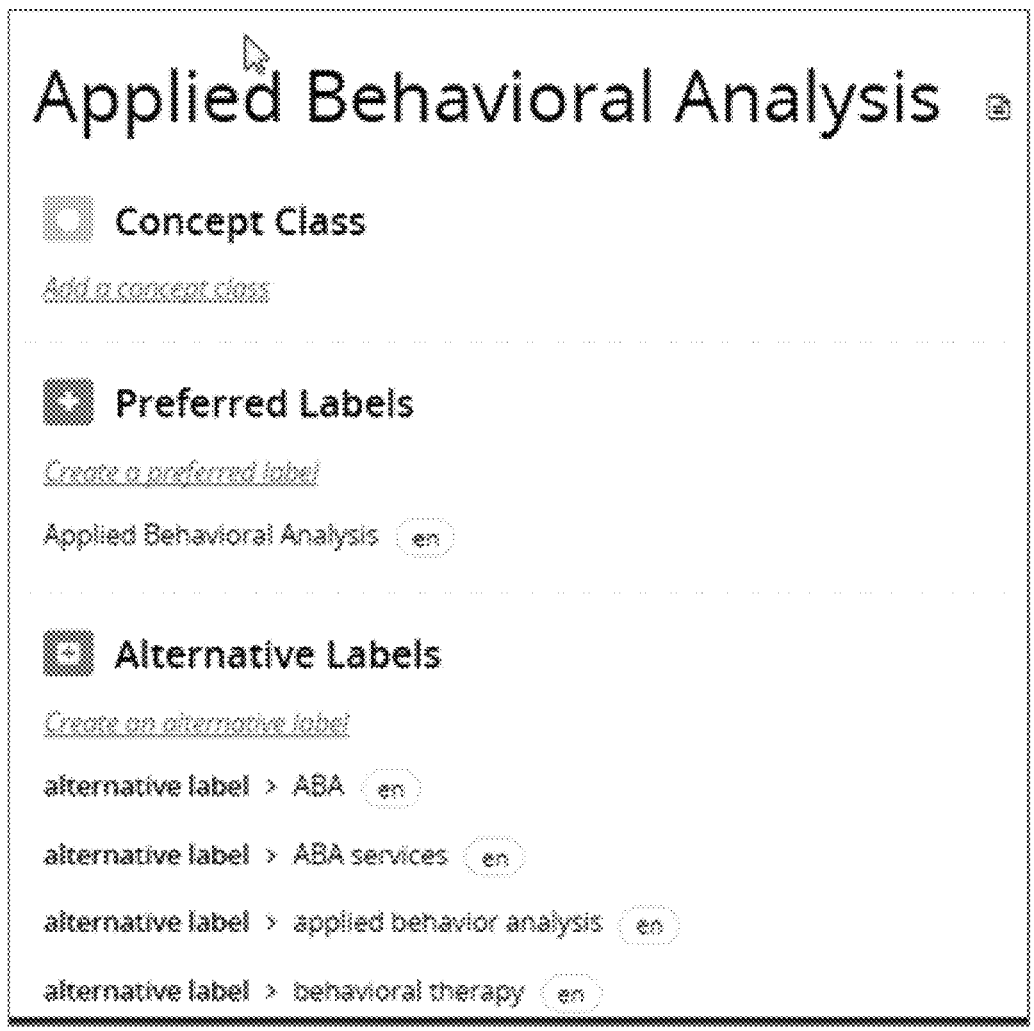

FIG. 7C provides an additional example view of relationships between the term: APPLIED BEHAVIORAL ANALYSIS and a plurality of other terms. For example, APPLIED BEHAVIORAL ANALYSIS may be indicated as a preferred label for the term (and accordingly the predicate of an RDF triple may indicate that APPLIED BEHAVIORAL ANALYSIS is the PREFERRED LABEL for APPLIED BEHAVIORAL ANALYSIS. This sort of self-referential RDF triple may be utilized in certain embodiments to establish particular characteristics of a term, such as the term being the preferred label for itself. As shown in FIG. 7C, other alternative labels are also identified for the term APPLIED BEHAVIORAL ANALYSIS (and accordingly the RDF triples including the indicated terms comprise a predicate indicating that the terms are ALTERNATIVE LABELS for APPLIED BEHAVIORAL ANALYSIS). For example, ABA is indicated as an ALTERNATIVE LABEL for APPLIED BEHAVIORAL ANALYSIS. Other example terminology is illustrated in FIG. 7C.

As yet another example not shown in the figures, the term THERAPY may be indicated as a TREATMENT FOR the term DEPRESSION, and the term DEPRESSION may be indicated as an EXAMPLE OF the term MENTAL HEALTH. In this example, the term DEPRESSION is included in two nodes, a first node linking the terms THERAPY and DEPRESSION and a second node linking the terms DEPRESSION and MENTAL HEALTH. In certain embodiments, these nodes may be linked in series, and a search system may be configured to identify the number of degrees of separation between terms based on the number of nodes traversed to reach terms. Following the above example, the term THERAPY is a single degree of separation away from the term DEPRESSION and THERAPY is two degrees of separation away from the term MENTAL HEALTH.

b. Terminology Sources

Terminology to be included within the ontology data storage area discussed herein may be retrieved from any of a variety of information sources. These information sources may be previously identified and/or known to the management computing entity 100 and may be periodically scraped/reviewed/analyzed for additionally added data, or may be a newly identified data source (e.g., manually identified and referred to the management computing entity 100 or automatically identified by the management computing entity 100). For example, terms to be included within the ontology data storage area may be retrieved from one or more of: (1) the document storage tree of the document storage database; (2) metadata tags associated with documents stored within the document storage database; (3) one or more terms identified as a result of Tf-Idf analysis of the document; (4) one or more external information sources (e.g., third party dictionaries, third party glossaries, third party thesauruses, and/or the like); (5) customer service interaction transcripts; and/or the like. Any of the information sources utilized to populate the ontology data storage area may be publicly available information sources (e.g., publicly available third party dictionaries) or private information sources (e.g., customer service chat log transcripts for a particular company). These terms may be identified in an iterative fashion, for example, by utilizing terms obtained from the documents themselves, such as metadata tags associated with one or more documents and/or terms identified as a result of Tf-Idf analysis of documents to search external information sources to identify potentially relevant terms identified in those third party sources as being related to the terms identified from the documents themselves. The terms identified from the documents themselves and the terms identified within the third party sources may then be utilized to search customer service interaction transcripts to identify other terms deemed potentially relevant and being reflective of terminology utilized by consumers. This process may be repeated one or more times, utilizing terms identified during prior searches to further hone later searches for new terms to be included within the ontology data storage area.

Information to be included within the ontology data storage area may be retrieved manually or automatically. For example, an administrator may identify relevant pairs of terms from an informational source and may assign an applicable predicate to those terms (e.g., the administrator may identify THERAPY and DEPRESSION as related terms, and may assign the predicate TREATMENT FOR to relate these terms).

In other embodiments, the management computing entity 100 may be configured to utilize machine learning, artificial intelligence, and/or the like to identify related terms within an information source, and to generate triples including related terms (e.g., newly identified terms within an information source paired with existing terms within an ontology storage area) and an assigned predicate indicating a relationship between those terms. In certain embodiments, the management computing entity 100 may be configured to utilize different algorithms or learning models for each informational source. Moreover, in certain embodiments, the management computing entity 100 may utilize a user interface to receive user input for approving suggested relationships between various terms. Such user interaction may be later utilized for training a machine-learning model to further refine the functionality of the management computing entity 100 to provide further refined suggestions upon the identification of other relationships between terms. For example, for customer service interactions, the management computing entity 100 may be configured to identify words or phrases utilized to signify a potential relationship between terms. Specifically, the management computing entity 100 may be configured to locate terms utilized to populate the ontology data storage area based at least in part on metadata tags existing within the document storage area. To identify additional relevant terms, the management computing entity 100 may be configured to construct a search query through customer service interactions using terms identified within the document storage tree, as indicated at FIG. 8. Because the query is configured to identify related terms that may be nested (e.g., as third level 401*c* or fourth level 401*d*) within document storage trees, the query comprises all higher-level terms within the document storage trees for which additional terms are desired. The example shown in FIG. 8 illustrates a plurality of terms, such as "mental health," "substance use disorder," "inpatient confinement," among others, for which relevant customer service interactions are desired.

Figure 9:
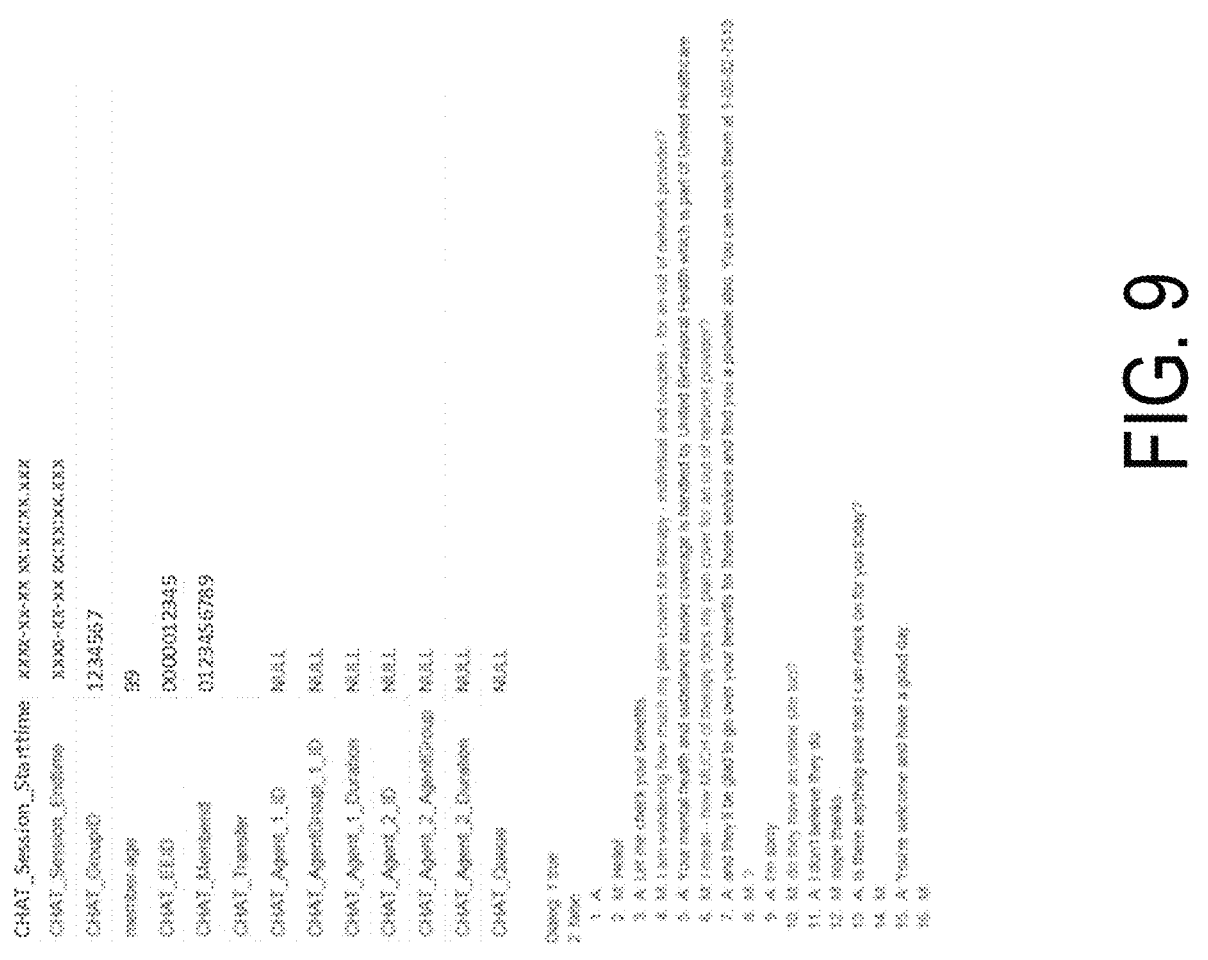

FIG. 9 illustrates an example of such a customer service interaction that may be retrieved as a result of the search query shown in FIG. 8, in the form of a chat log. The management computing entity 100 may be configured to automatically review the contents of such a customer service interaction to identify additional related terms that may be extruded from the customer service interaction and input into the ontology data storage area. For example, the management computing entity 100 may utilize phrases such as "did you mean [term]?" or "what does [term] mean?" which may indicate that terms used nearby within the customer service interaction may be linked. As another example, the management computing entity 100 may be configured to automatically determine that words linked within a thesaurus are synonyms unless expressly indicated to the contrary, and the management computing entity 100 may be configured to establish appropriate predicates between identified linked terms automatically based on this determined relationship.

Figure 10:
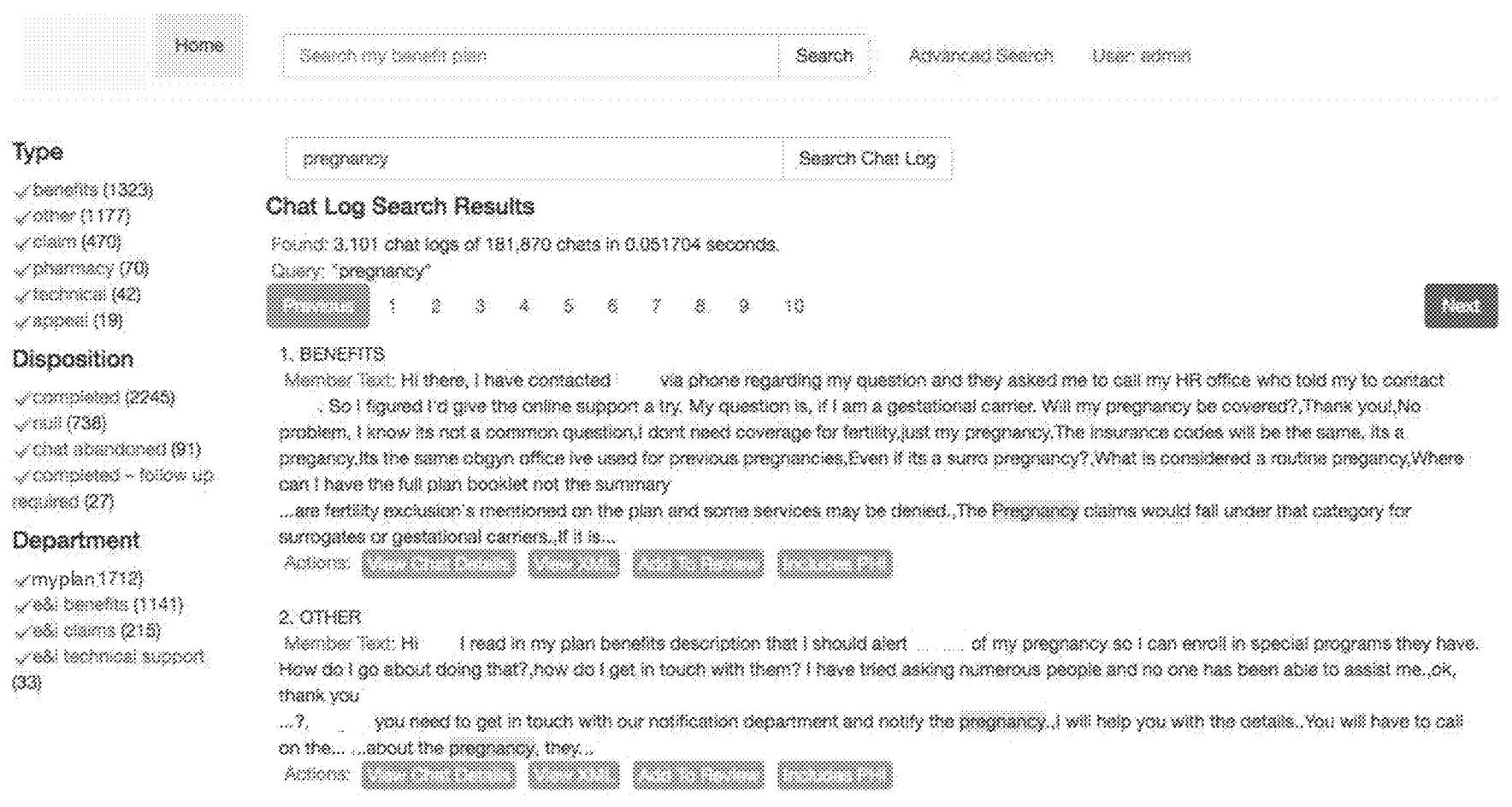

As yet another example, terms may be identified manually from customer service interactions to be included within the ontology data storage area. The manual identification of terms may be utilized as an alternative to automatic population of the ontology data storage area, or the manual identification of terms may be utilized to supplement the results of automatic methodologies for populating the ontology data storage area. In certain embodiments, manual review of customer service interactions utilizes customer service interaction search systems (e.g., having a corresponding user interface) to identify particular customer service interactions that may contain terminology to be linked with existing terms within the ontology data storage area. Terms input to the customer service interaction search systems may be identified from one or more data sources, such as those discussed above in relation to automatic identification of terms for inclusion within the ontology data storage area (e.g., (1) the document storage tree of the document storage database; (2) metadata tags associated with documents stored within the document storage database; (3) one or more terms identified as a result of Tf-Idf analysis of the document; (4) one or more external information sources (e.g., third party dictionaries, third party glossaries, third party thesauruses, and/or the like); (5) previously searched customer service interaction transcripts; and/or the like). For example, as shown in FIG. 10, a keyword search for the term "pregnancy" via a customer service interaction search system identifies 3,101 customer service interactions that may be reviewed for additional terminology to be linked with the term "pregnancy" (the search results may show the search term in highlighted text). Moreover, as shown in FIG. 10, customer service interactions may be classified (e.g., by type, disposition, department, and/or the like), and accordingly these customer service interactions may be reviewed considering the classification associated with the customer service interactions to determine whether a particular customer service interaction is likely to contain additional terminology to further supplement the ontology data storage area.

c. Inter Relationship Between Stored Terms and Stored Documents

The search system enables users to identify documents and/or document subsections relevant to search terms provided by a user. Thus, the system provides a defined relationship between the stored terminology of the ontology data storage area and the stored documents and/or other data files, thereby enabling the search system to retrieve relevant documents from the document storage database based on terminology relationships between the user's search term and related terminology identified through relationships established within triples of the ontology data storage area.

In certain embodiments, terms identified as metadata tags of documents, document subsections, and/or the like may have identical counterpart terms within the ontology data storage area. The identical terms within document metadata tags and the ontology data storage area establish a link between terms of the ontology data storage area and documents associated with the metadata tags. Accordingly, when a particular term is identified as a relevant expanded term based on the user-provided search term, documents having metadata tags including the same particular term may be identified as search results for the search. Moreover, as updates to the ontology data storage area are generated (e.g., based on new terms identified in one or more known data sources, based on new terms identified in one or more newly identified data sources and/or the like), metadata tags for documents, document subsections, and/or the like may be updated to reflect the newly identified terms to maintain up-to-date links between the documents, document subsections, and/or the like and terms included within the ontology data storage area.

d. Example User Interface

In certain embodiments, the initial user interface screen presented to a user comprises a dialog box configured to accept user input. The dialog box may be presented within a search bar integrated into a webpage, as a portion of an application executable locally on a user computing entity 110 (e.g., within a portion of a browser frame), within a graphical user interface of a software "app" executable via a mobile device, and/or the like. The search bar interface may be integrated as a portion of a larger graphical user interface, for example a larger webpage providing additional information to the user.

Upon entry of user input into the search bar, the graphical user interface may be configured to provide suggestions of terms the user may be searching for. These suggestions may be updated in real-time as the user types, such that a user may select from a list of suggested search terms without having to complete typing a particular search term of interest. However, it should be understood that the search bar may provide more basic functionality in certain embodiments, for example by simply accepting a user-provided search term.

After initiation of the search (e.g., after a user selects a search button or otherwise requests the management computing entity 100 to complete the search functionality), the management computing entity 100 is configured to present a search results graphical user interface to the user (e.g., via a display, by causing a user computing entity 110 to display the search results graphical user interface, and/or the like).

The search results display may provide an indication of the search term provided by the user, as well as documents, document subsections, and/or the like included within a search results listing. As shown, the search results listing may comprise interactive hyperlinks that may be individually selected by a user and which direct the user computing entity 110 to display the document and/or document subsection indicated by the search results listing.

The search results listing may present the identified search results within an order selected based at least in part on a relevance score determined for the identified search results. Various terms that may arise from a search for APPLIED BEHAVIORAL ANALYSIS, and corresponding relevance scores (presented in a range from 0.00-1.00, wherein a score of 1.00 indicates extreme relevance, and a score of 0.00 indicates no relevance) are shown in FIG. 11. The example data presented in FIG. 11 may be intermediate data that is not presented to a user. As shown in FIG. 11, relevance scores are presented for related terms, which may ultimately be utilized to determine relevance scores for documents presented to a user in a search results display. In such embodiments, this intermediate, term-based relevance scoring is not shown to users, but the ultimate relevance score for individual documents in the search results may be provided to users.

For example, the search results listing may be presented to display those documents deemed most relevant to the user's search at the top of the presented results listing, and those results deemed least relevant (but still sufficiently relevant to be included within the search results) at the end of the presented results listing. In certain embodiments, a relevance score, which may be utilized to rank the search results from most to least relevant, may be determined via any of a variety of methodologies. For example, the relevance score may be determined based at least in part on the number of degrees of separation between the user's entered search terms and the term determined to match with metadata of a document (a higher number of degrees of separation correlate with a lower relevance score). As yet another example, the relevance score may be determined based at least in part on the count of relevant terms included within a particular document, and/or the like.

4. Change Incorporation

Changes to the document storage structure of the document storage database (e.g., the addition of new documents, the replacement of existing documents with updates, the removal of documents, and/or the like) and/or changes to the ontology data storage area (e.g., the addition of new terms, the addition of new ontology relationships between terms, and/or the like) may be incorporated into existing, in-use (published) versions of these storage areas. In certain embodiments, the management computing entity 100 may be configured to automatically search for potential updates to the document storage database and/or the ontology data storage area from known data sources periodically (e.g., weekly, monthly, annually, and/or the like). The management computing entity 100 may alternatively and/or additionally be configured to initiate update processes upon receipt of data suggesting an update is necessary. The receipt of such data may be as a result of the periodic search noted above, or may be unprompted, for example by a user providing such data to the management computing entity 100 after coincidentally locating a new data source that should be considered for updates to the ontology data storage area. In the latter instance, the management computing entity 100 may be configured to scrape data from the new information data source (if possible) to provide updates to the document storage database and/or ontology data storage area. In certain embodiments, the newly identified data source may be added to a stored listing of known data sources that may be periodically reviewed for updates as noted above.

The management computing entity 100 may utilize one or more process stream processing mechanisms (e.g., Apache Kafka) to coordinate various processes for determining whether any updates to the ontology data storage area (or the document storage database) are necessary upon receipt of new data, to implement such updates upon identification, to test updates to the ontology data storage area and/or the document storage data, and/or to publish changes to the ontology data storage area and/or the document storage database for future usage by the search system.

In certain embodiments, upon identifying a potential change for the ontology data storage area and/or the document storage database (e.g., identifying a new term within an information source that may be relevant to other terms previously stored within the ontology data storage area), the management computing entity 100 may utilize the stream processing mechanism to initiate various processes for reviewing and intaking the newly identified data. Until this newly identified data is incorporated into a published version of the document storage database and/or the ontology data storage area, such newly identified data, as well as any suggested changes to the document storage database and/or the ontology data storage area may be stored in a temporary data storage area.

The management computing entity 100 may utilize the newly identified information to identify relevant documents, documents subsections, portions of the ontology data storage area, and/or the like that may utilize updates based on the newly identified data. A text mining module of the management computing entity 100 may mine the identified relevant subsections to determine whether the potential updates may be incorporated therein. If the potential updates are already reflected within the relevant subsections, the management computing entity 100 discontinues any update processes. If the potential updates are determined to be potential candidates for inclusion within the identified relevant subsections, the management computing entity 100 may generate potential relationships with existing terminology (e.g., by generating potential new RDF triples, identifying links with existing terminology as well as potential predicates for those RDF triples). The management computing entity 100 may then generate a user prompt (e.g., via a user interface) to confirm/edit the potential relationships with existing terminology. Once user input is received, the management computing entity 100 may test the proposed changes to the document storage database and/or ontology data storage area, for example to determine whether new ontology data properly classifies documents and accurately performs keyword searches. If testing is successful, the proposed changes are incorporated into a published version of the document storage database and/or ontology data storage area (e.g., by publishing an updated version of the document storage database and/or ontology data storage area including the proposed changes). If the testing is unsuccessful, an error message may be provided to the user together with prompts to update the proposed relationships between terms. Once the user provides additional updates, the management computing entity 100 may retest the proposed changes prior to implementing within published versions of the document storage system and/or the ontology data storage area. In certain embodiments, the management computing entity 100 may be further configured to provide a notification to a user via a graphical user interface upon successful publication of the updates within the document storage database and/or ontology data storage area. Moreover, as mentioned above, the management computing entity 100 may utilize results of the testing functionality and/or the user-provided edits to the proposed relationships to teach machine learning and/or other artificial intelligence system to provide more refined suggestions for future updates.

VI. Example System Operation

An example operation will now be described in reference to a system implementation within the healthcare industry.

Figure 12:
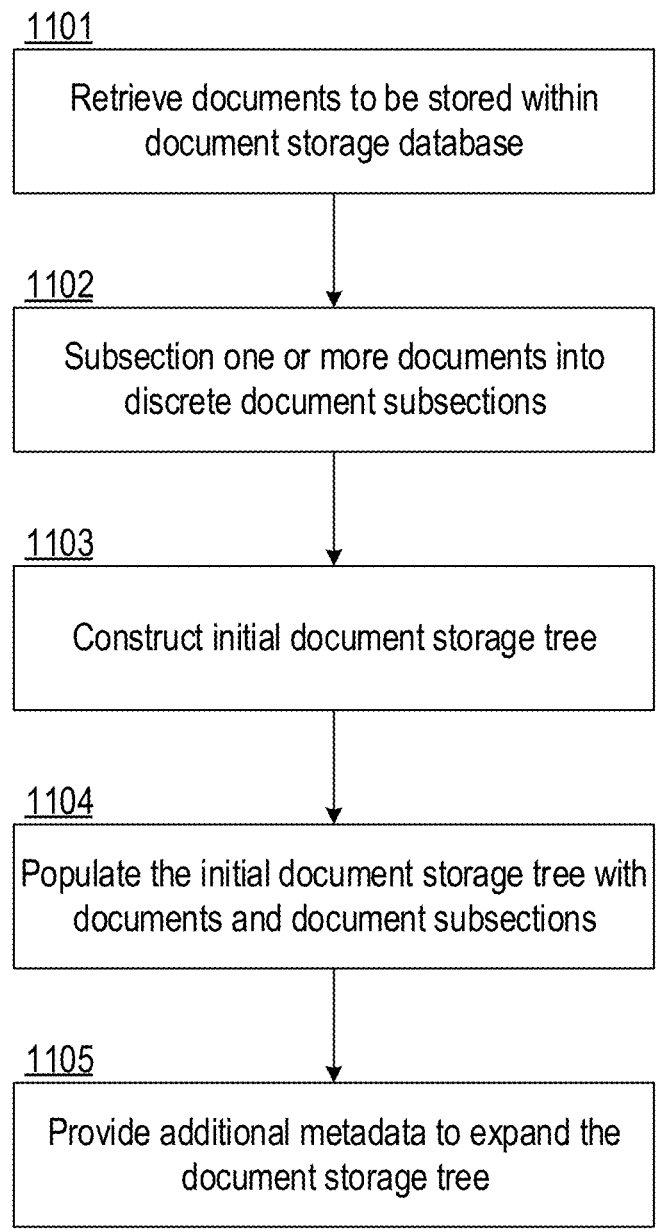
FIG. 12 is a flowchart including example steps for populating a document storage database according to one embodiment.

FIG. 12 illustrates a flowchart of an example methodology for populating a document storage database according to one embodiment. During initial setup, the document storage database may be populated with documents and/or document subsections related to a particular healthcare implementation. As indicated at Block 1101, the documents to be stored within the document storage database are retrieved. In those embodiments in which document subsections are separately identified within the document storage database, the documents may be reviewed to determine appropriate separations between document subsections, and the management computing entity 100 subsections the one or more documents based on the determined appropriate separation locations, as indicated at Block 1102. Upon identifying discrete document subsections and/or full documents to be stored within the document storage database, the initial setup continues by establishing an initial document storage tree within the document storage database into which the individual documents may be stored, as indicated at Block 1103. The initial document storage tree may be established based at least in part on data relationships retrieved from an external data source. For example, the initial graphical data structure may have two levels of data (e.g., having first level data locations and nested second level data locations), as shown in FIG. 4, for example. Each of the data locations within the initial data structure may be associated with a data storage location for one or more corresponding documents or document subsections.

Upon establishing the initial graphical data structure with included document storage locations, the plurality of documents and/or document subsections may be stored in corresponding document storage locations within the data storage structure as indicated at Block 1104.

In certain embodiments the graphical data structure may be further expanded with nested data (e.g., third level data nested within the second level data locations and/or fourth level data nested within the third level data) retrieved from additional third party sources, as indicated at Block 1105. For example, the data included in these third level data locations may comprise metadata to be associated with the stored documents, metadata to be further descriptive of the data storage locations, and/or the like. As a specific example, the first and second level data locations may be characterized by terminology utilized by healthcare industry professionals to describe various conditions, treatments, diseases, pharmaceuticals, and/or the like. The third level data locations may be characterized by terms utilized more commonly by those that are not fully integrated in the healthcare industry. These third level terms may be embodied as colloquial reference terminology, slang, alternative terminology, synonyms, descriptive terms (or phrases), and/or the like. These third level data may be obtained from healthcare glossary sources (e.g., providing plain-language descriptions of various healthcare-specific terminology), dictionaries, or other public or private data sources. As yet another example, terminology included within the third level data storage locations may be retrieved from customer service interaction transcripts between a customer service representative of a healthcare company and one or more customers. For example, such interaction transcripts may be reviewed (e.g., manually or automatically) to identify relationships between various terms, such as healthcare-specific terminology and common language utilized to refer to a similar concept. Terminology identified as a result of review of these interaction transcripts may be populated as third level data within the data storage structure. In yet another example, terms identified for inclusion within the third level data storage locations may be identified based on an analysis of the contents of the document itself. Tf-Idf analysis, for example, may be utilized to identify relevant terms within a particular document, and those identified terms may be stored within the third level data storage locations of the data storage structure.

Figure 13:
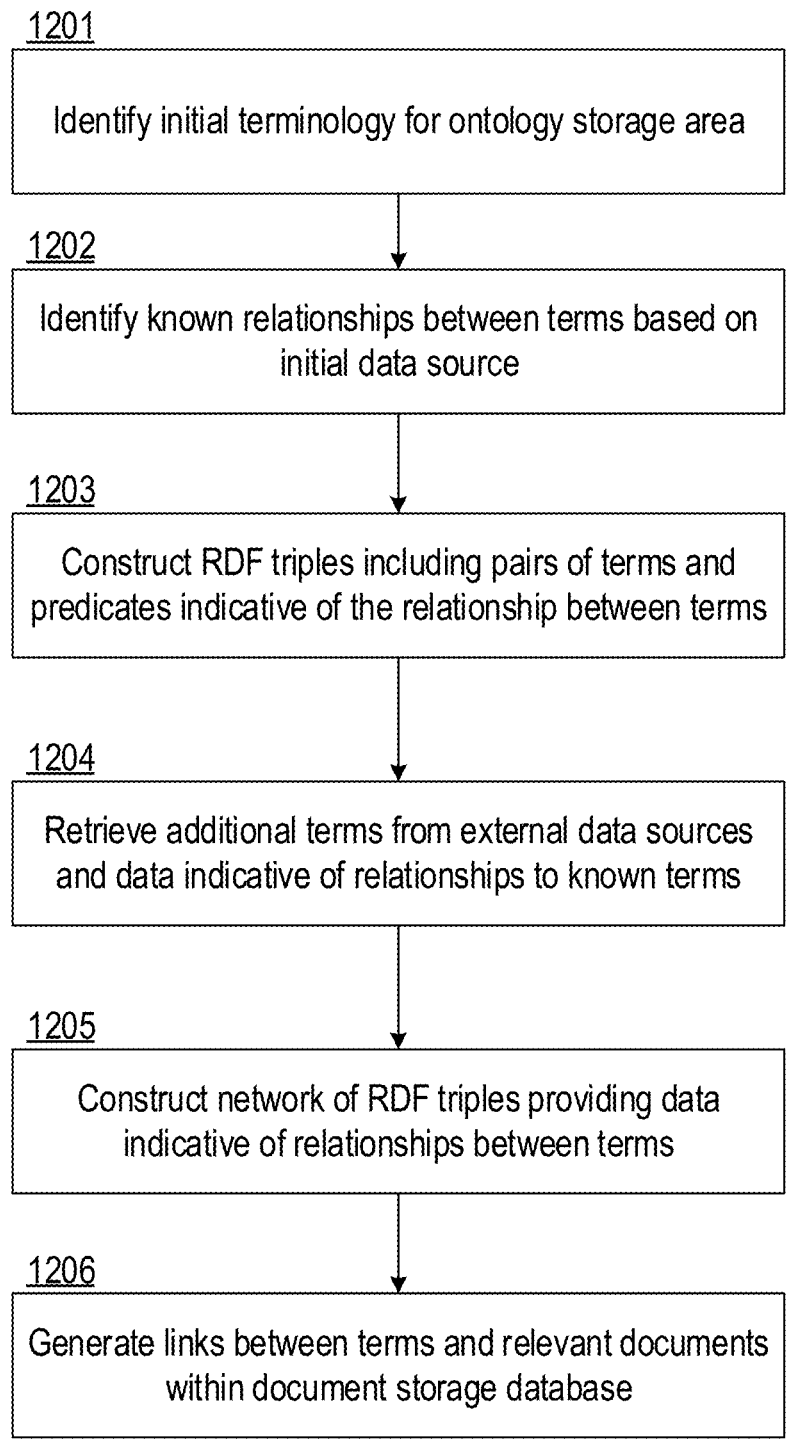
FIG. 13 is a flowchart including example steps for populating an ontology data storage area according to one embodiment.

Data within the various levels of the data storage structure may be further stored or otherwise may be referenced within a graphical ontology data storage area accessible to a search system. FIG. 13 illustrates various steps in populating the graphical ontology data storage area according to various embodiments. As indicated at Block 1201, the initial step is to identify terminology for storage within the ontology data storage area. This initial terminology may be embodied as the various metadata tags indicated within the document storage tree, and indeed the metadata tags stored within the document storage tree may serve as data stored within the ontology data storage area. In other words, the ontology data storage area may be coextensive with the document storage database, such that data stored within the document storage tree of the document storage database is accessible and usable within the ontology data storage area.

The graphical ontology data storage area provides data indicative of relationships between various terms (e.g., terms stored within the data storage structure or other terms deemed relevant to expand the search capabilities of the search system). Thus, the initially identified terms are provided with data indicative of known relationships therebetween, as indicated at Block 1202. Moreover, as noted above, the ontology data storage area (and the document storage database) may be updated (e.g., periodically) to reflect newly identified information/terminology/data that may be utilized to provide additional metadata tags for existing documentation, to identify additional terms that may be related to previously known terms, and/or the like. Upon incorporation of these changes into published versions of the document storage database and/or the ontology data storage area, the management computing entity 100 may utilize the updated versions of the document storage database and/or the ontology data storage area to complete the described search processes.

As discussed herein, the graphical ontology data storage area of certain embodiments stores these terms as constructed RDF triples (as indicated at Block 1203) wherein each RDF triple indicates a relationship between two terms (the "triple" is in reference to the two terms stored therein together with data indicative of a relationship therebetween). Terms may be included in a plurality of RDF triples, and therefore the RDF triples may establish links between a plurality of terms stored within the graphical ontology data storage area, such that links between terms may be characterized based at least in part on the number of degrees of separation between terms (indicative of the number of RDF triples that separate the terms). As discussed in greater detail herein, the search system may be configured to utilize data indicative of the number of degrees of separation between a user's entered search terminology and a particular term identified as relevant when determining how to rank search results.

Moreover, the ontology data storage area may be configured to further supplement the terms stored therein by retrieving additional terms for external data sources, and data indicative of relationships between various terms to construct additional RDF triples within the ontology data storage area as indicated at Blocks 1204-1205. In certain embodiments, these additional terms may be retrieved and incorporated into the ontology data storage area according to methodologies described above in reference to populating the third and fourth levels of the document storage tree. For example, terminology may be retrieved from various third party sources for inclusion within the ontology data storage area, terminology may be retrieved from customer service interaction transcripts, and/or the like. Because these terms are not previously linked with particular documents (like those terms included as metadata within the document storage tree), the ontology data storage area and the document storage database may collectively establish links between terms and relevant documents (e.g., by populating metadata tags with documents corresponding to various terms deemed relevant), if applicable, as indicated at Block 1206. However, it should be understood that not every term need be linked with a particular document. Instead, certain terms may be linked with other terms (e.g., through a string of RDF triples), and those related terms may be linked with documents, if applicable.

Figure 14:
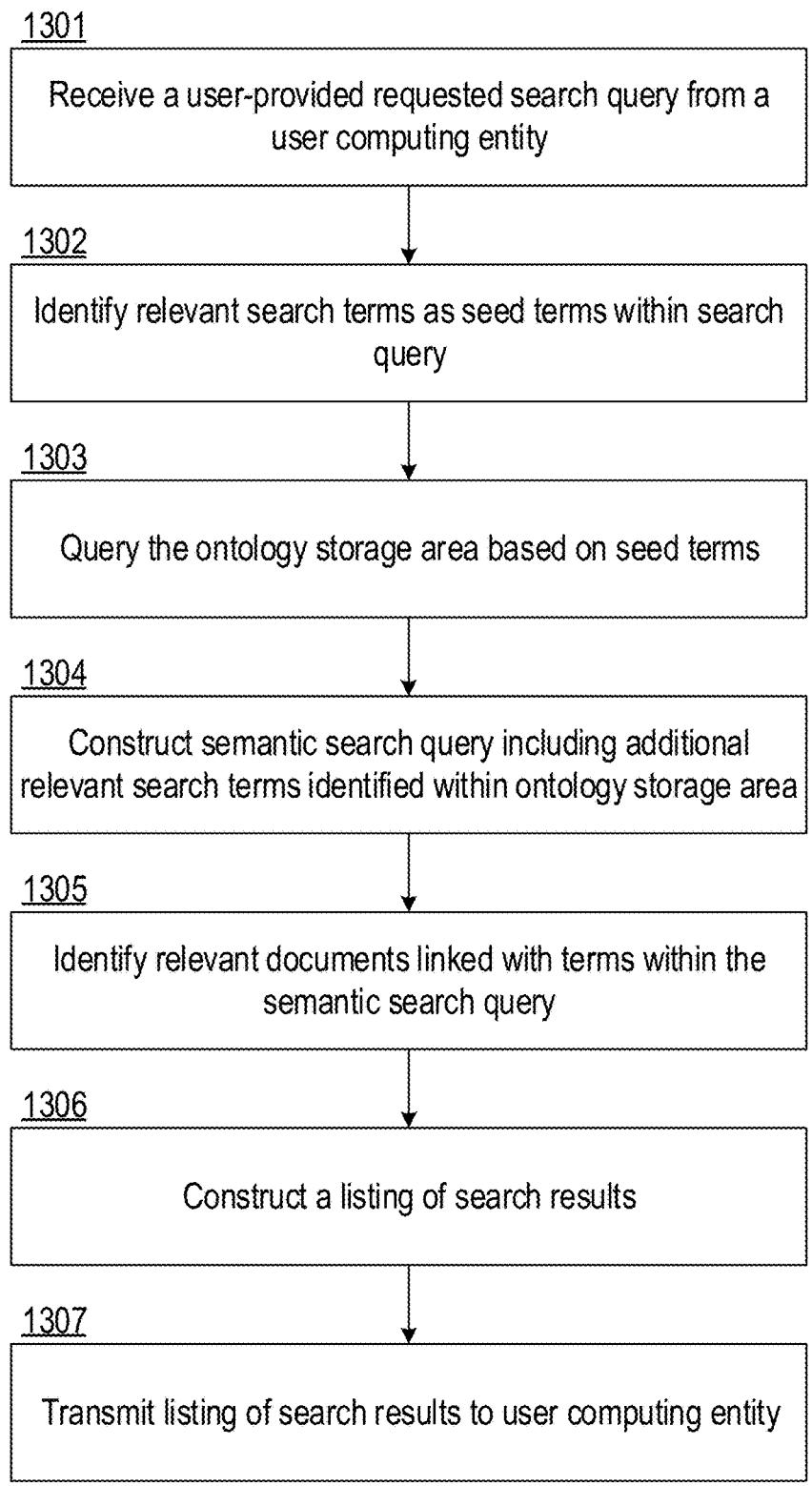
FIG. 14 is a flowchart including example steps for executing a search query according to one embodiment.

The search system is configured to retrieve relevant documents from the document storage database and to present those documents to a user in response to a search query provided by a user. FIG. 14 provides an illustration of example steps that may be performed during a search process according to various embodiments. The search system is configured to receive a requested search query as user input via a search interface provided via a user computing entity 110 as indicated at Block 1301. The search query may be initially received at the user computing entity 110, and may be transmitted to the management computing entity 100 to execute the requested search. Ultimately, the search results generated as a result of the search are transmitted back to the user computing entity 110 for presentation to the user. The requested search query may comprise one or more terms, phrases, and/or the like. As indicated at Block 1302, upon receipt of the requested search query at the management computing entity 100, the search system is configured to parse the received search query to identify relevant terminology for inclusion in a search to be executed. The search system may be configured to execute one or more query parsing algorithms (e.g., in real-time), which may be configured to utilize one or more data sources (e.g., the graphical terminology database) to distinguish between relevant and irrelevant terms presented within a search. In certain embodiments, the query parsing algorithms may be configured to determine that complete phrases are relevant terms to be utilized during the search and/or that individual words included within a searched phrase should be treated separately during the search. For example, the query parsing algorithm may be configured to determine that a search for "yellow colored skin" should be treated as a complete phrase, rather than searching for the terms "yellow," "colored," and "skin" separately. Whereas the former, phrase-based search may return search results relevant to jaundice and its treatments, the latter, word-based search may return results relating to sunburned skin, dry skin, miscolored stool, and/or the like.

The query parsing algorithm may be configured to disregard generic terms such as "the," "also," "because," and/or the like that have been determined to add little value to an eventual search. Moreover, the query parsing algorithm may have an integrated spell-check functionality to search for misspelled terminology and to suggest likely alternatives for those misspelled terms. The spell-check functionality may be integrated into the query parsing algorithm as a fuzzy matching logic algorithm to look for similarly spelled terms within the ontology data storage area, however it should be understood that any of variety of spell-checking techniques may be utilized.

Once the search system identifies relevant search terms (referred to subsequently as "seed terms") from the user-provided search query, these seed terms may be stored (temporarily) in memory during execution of the search. The search system utilizes the seed terms to query the ontology data storage area to identify those terms as indicated at Block 1303. Once the seed terms are identified, the search system begins constructing a semantic search query that is ultimately utilized to generate search results including identified documents relevant to the user's search query as indicated at Block 1304. The search system traverses RDF triples including the seed terms from the search query to identify related terms and their respective relationships to the seed terms. The search system may add identified related terms to the temporary storage of search terms together with data indicating the number of degrees of separation between the identified search terms and the seed terms. The search system may then repeat the process of traversing RDF triples including the seed terms and the terms identified as being related to those seed terms, thereby identifying additional terms that are one or more degrees of separation away from the seed terms. This process may continue until the occurrence of a trigger event, which may be defined within the search system. For example, the trigger event may be a determination that a defined time interval has elapsed since the initiation of the search; a determination that a maximum number of degrees of separation from the seed terms has been reached; a determination that a maximum number of search terms has been identified; a determination that the entirety of the terminology database has been traversed; and/or the like. The complete, semantic search query utilized to identify relevant documents is defined by the terms included within the temporary storage location of search terms—this listing of terms being built as the search system identifies relevant terms related to the seed terms through the one or more traversals of the ontology data storage area.

Relevant documents, document subsections, and/or documents or document subsections are identified for inclusion within the listing of search results as indicated at Block 1305 by identifying links between particular documents, document subsections, and/or documents or document subsections and terms included within the expanded search terms. As mentioned above, those links may be identified as having matching terms included within the expanded search terms and the metadata associated with a particular document. In certain embodiments, the identification of relevant documents and/or document subsections to be included within the search results ultimately returned to the user may be performed simultaneously with the generation of the expanded listing of search terms. For example, upon identifying a particular term for inclusion within the expanded listing of search terms, the search system may simultaneously determine whether the search term relates to any linked documents, document subsections, and/or the like. Those linked documents may then be identified within a temporary memory storage area for compiling a listing of search results. As the search for the expanded listing of search terms progresses, the search system may simultaneously begin building the listing of search results to be returned to the user (e.g., via the user computing entity 110). In other embodiments, the search results may be identified sequentially, after identifying all of the expanded listing of search terms to be utilized in the document query.

Upon identifying the search results via the search system, the management computing entity 100 constructs a listing of the search results to be presented to the user via the user computing entity 110, as indicated at Block 1306. As a part of constructing this listing of search results, the management computing entity 100 determines a hierarchical ranking of the search results such that the search results may be presented in order of relevance of the included search result documents. The hierarchical ranking may be determined based at least in part on a plurality of factors, such as the number of degrees of separation between the seed terms (provided by the user) and the terms utilized to generate a link to the document included within the search result, the number of times a particular term appears within the document, the location of the term within the document (e.g., a document having a term included within a title and/or subtitle may be given more weight than a document having a term appear in a body paragraph), preassigned weights given to documents (e.g., a healthcare benefits user manual may have a higher weight assigned thereto than a quick start guide for utilizing an online claims submission system), and/or the like.

Once the hierarchical listing of search results is constructed, the management computing entity 100 transmits the search results to the user computing entity 110 for presentation to the user, as indicated at Block 1307. The management computing entity 100 causes the user computing entity 110 to present the search results in a graphical display providing defined types of information to the user. For example, the graphical display may comprise interactive hyperlinks for each search result that enables a user to select the hyperlink to be redirected (via the user computing entity 110) to the document associated with the link. The graphical display may further include data indicative of reasons why a particular document was included as a search result (e.g., providing a snippet of a document highlighting an expanded term utilized within the document; indicating that a particular expanded search term was identified as a metadata tag associated with the document; and/or the like). The search results user interface may further provide a brief description of each document included within the search results (e.g., the brief description being identified from metadata tags stored in association with the user interface).

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-based database interrogation system for retrieving documents from a document storage database, the database interrogation system comprising:
   a document storage database storing a plurality of documents with a plurality of associated topical metadata tags, wherein at least a portion of the plurality of documents are stored with subsection specific metadata tags associated with discrete subsections of content within a document;
   a graphical ontology data storage area storing a plurality of terms and a plurality of nodes representative of logical relationships between terms stored therein, wherein the plurality of nodes are Resource Descriptive Framework (RDF) triples, wherein each RDF triple comprises two terms and a predicate indicative of a relationship between the two terms and the logical relationships and predicates of each RDF triple are generated based at least in part on a determination that terms within an RDF triple are utilized within a single customer service interaction transcript;
      wherein at least a portion of the terms stored within the graphical ontology data storage are linked with corresponding documents stored within the document storage database; and
   a processing system configured to:
      receive, from a user computing entity, a user-provided search query for documents, wherein the user-provided search query comprises one or more seed terms;
      expand the user-provided search query to generate a semantic search query comprising expanded search terms and the seed terms, based on logical relationships identified between the seed terms and additional terms represented within the graphical ontology data storage;
      identify relevant documents of the plurality of documents stored within the document storage database linked with at least one of the expanded search terms or the seed terms; and
      generate a search result graphical user interface comprising data representing the relevant documents.

2. The computer-based database interrogation system of claim 1, wherein:
   identifying relevant documents of the plurality of documents stored within the document storage database comprises identifying subsection-specific metadata tags associated with relevant discrete subsections of content within a document that are linked with at least one of the expanded search terms of the semantic search query; and
   generating a search result graphical user interface comprises including data representing the identified relevant discrete subsections of content within a document.

3. The computer-based database interrogation system of claim 1, wherein the graphical ontology data storage is within the document storage database.

4. The computer-based database interrogation system of claim 1, wherein the processing system is further configured to rank the identified relevant documents based on relevance to the user-provided search query.

5. The computer-based database interrogation system of claim 1, wherein the processing system is further configured to transmit the search results graphical user interface to the user computing entity.

6. A computer-implemented method for retrieving documents from a document storage database, the method comprising:
    storing, within a document storage database, a plurality of documents with a plurality of associated topical metadata tags, wherein at least a portion of the plurality of documents are stored with subsection specific metadata tags associated with discrete subsections of content within a document;
    storing, within a graphical ontology data storage, a plurality of terms and a plurality of nodes representative of logical relationships between terms stored therein, wherein the plurality of nodes are Resource Descriptive Framework (RDF) triples, wherein each RDF triple comprises two terms and a predicate indicative of a relationship between the two terms and the logical relationships and predicates of each RDF triple are generated based at least in part on a determination that terms within an RDF triple are utilized within a single customer service interaction transcript and wherein at least a portion of the terms stored within the graphical ontology data storage are linked with corresponding documents stored within the document storage database;
    receiving a user-provided search query for documents, wherein the user-provided search query comprises one or more seed terms;
    expanding the user-provided search query to generate a semantic search query comprising expanded search terms and the seed terms, based on logical relationships identified between the seed terms and additional terms represented within the graphical ontology data storage;
    identifying relevant documents of the plurality of documents stored within the document storage database linked with at least one of the expanded search terms of the semantic search query; and
    generating a search result graphical user interface comprising data representing the relevant documents.

7. The computer-implemented method of claim 6, wherein:
    identifying relevant documents of the plurality of documents stored within the document storage database comprises identifying subsection-specific metadata tags associated with relevant discrete subsections of content within a document that are linked with at least one of the expanded search terms of the seed terms; and
    generating a search result graphical user interface comprises including data representing the identified relevant discrete subsections of content within a document.

8. The computer-implemented method of claim 6, wherein the graphical ontology data storage is within the document storage database.

9. The computer-implemented method of claim 6, further comprising steps for ranking the identified relevant documents based on relevance to the user-provided search query.

10. The computer-implemented method of claim 6, further comprising steps for transmitting the search results graphical user interface to the user computing entity.

11. A computer program product comprising a non-transitory computer readable medium having computer program instructions stored therein, the computer program instructions when executed by a processor, cause the processor to:
    store, in a document storage database, a plurality of documents with a plurality of associated topical metadata tags, wherein the plurality of nodes are Resource Descriptive Framework (RDF) triples, wherein each RDF triple comprises two terms and a predicate indicative of a relationship between the two terms and the logical relationships and predicates of each RDF triple are generated based at least in part on a determination that terms within an RDF triple are utilized within a single customer service interaction transcript and wherein at least a portion of the plurality of documents are stored with subsection specific metadata tags associated with discrete subsections of content within a document;
    store, in a graphical ontology data storage, a plurality of terms and a plurality of nodes representative of logical relationships between terms stored therein, wherein at least a portion of the terms stored within the graphical ontology data storage are linked with corresponding documents stored within the document storage database; and
    receive, from a user computing entity, a user-provided search query for documents, wherein the user-provided search query comprises one or more seed terms;
    expand the user-provided search query to generate a semantic search query comprising expanded search terms and the seed terms, based on logical relationships identified between the seed terms and additional terms represented within the graphical ontology data storage;
    identify relevant documents of the plurality of documents stored within the document storage database linked with at least one of the expanded search terms or the seed terms; and
    generate a search result graphical user interface comprising data representing the relevant documents.

12. The computer program product of claim 11, wherein:
    identifying relevant documents of the plurality of documents stored within the document storage database comprises identifying subsection-specific metadata tags associated with relevant discrete subsections of content within a document that are linked with at least one of the expanded search terms of the semantic search query; and
    generating a search result graphical user interface comprises including data representing the identified relevant discrete subsections of content within a document.

13. The computer program product of claim 11, wherein the graphical ontology data storage is within the document storage database.

14. The computer program product of claim 11, wherein the non-transitory computer readable storage medium further stores computer program instructions configured to, when executed by a processor, cause the processor to rank the identified relevant documents based on relevance to the user-provided search query.

15. The computer program product of claim 11, wherein the non-transitory computer readable storage medium further stores computer program instructions configured to, when executed by a processor, cause the processor to transmit the search results graphical user interface to the user computing entity.

* * * * *